United States Patent [19]
Okamoto et al.

[11] Patent Number: 5,923,813
[45] Date of Patent: *Jul. 13, 1999

[54] APPARATUS AND METHOD FOR IMAGE CODING AND RECORDING/REPRODUCING

[75] Inventors: Keishi Okamoto, Katano; Hideaki Mita, Kobe; Tatsushi Bannai, Sakai, all of Japan

[73] Assignee: Matsushita Electric Industrial Co., Ltd., Kadoma, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/713,166

[22] Filed: Sep. 12, 1996

[30] Foreign Application Priority Data

Sep. 19, 1995 [JP] Japan .................................... 7-239445

[51] Int. Cl.$^6$ .............................. H04N 5/917; H04N 7/26
[52] U.S. Cl. ........................................... 386/109; 386/112
[58] Field of Search ..................... 386/109, 111, 386/112, 124, 46, 1, 27, 33, 40; 348/384, 403, 419; 360/32

[56] References Cited

U.S. PATENT DOCUMENTS

| | | | |
|---|---|---|---|
| 4,862,295 | 8/1989 | Tanaka et al. | 360/48 |
| 5,329,375 | 7/1994 | Juri et al. | 386/96 |
| 5,351,131 | 9/1994 | Nishino et al. | 358/335 |
| 5,371,603 | 12/1994 | Nishino et al. | 358/335 |

FOREIGN PATENT DOCUMENTS

| | | |
|---|---|---|
| 0482888 | 4/1992 | European Pat. Off. . |
| 0551694 | 7/1993 | European Pat. Off. . |
| 522715 | 1/1993 | Japan . |
| 644696 | 2/1994 | Japan . |
| 654294 | 2/1994 | Japan . |
| 6350994 | 12/1994 | Japan . |

OTHER PUBLICATIONS

Takakura et al., ITEJ Technical Report vol. 16, No. 35, pp. 7–12, VIR' 92–30 (Jun. 1992), "A Study on the Reproduced Picture Quality in the Variable Speed Mode of the Digital VCR".

European Search Report related to European Patent Application No. 96114813.7 dated Aug. 27, 1998.

*Primary Examiner*—Robert Chevalier
*Attorney, Agent, or Firm*—Renner, Otto, Boisselle & Sklar, P.L.L.

[57] ABSTRACT

An image coding and recording/reproducing apparatus for encoding video signals using variable-length coding and for recording the video signals in units of fixed-length sync blocks includes: an orthogonal transform unit for performing an orthogonal transform on each transformation block including a plurality of pixels and for obtaining orthogonal transform coefficients for each transformation block; a coding processor for generating encoded data for each encoding group including a plurality of the transformation blocks, the encoded data being obtained by variable-length encoding the orthogonal transform coefficients of each transformation block and by arranging the resultant encoded transform coefficients in the order of increasing component frequency starting with a low frequency component; a storing processor for dividing a plurality of the sync blocks into low frequency sync blocks and high frequency sync blocks, each of the low frequency sync blocks being assigned with one of the encoding groups, a first portion of the encoded data of the encoding group being stored in the corresponding low frequency sync block from a beginning to an Lth bit, a second portion of the encoded data at a (L+1)th bit and beyond being stored in the high frequency sync blocks in a prescribed order; and a recording unit for recording the low frequency sync blocks and the high frequency sync blocks which store the encoded data therein on a recording medium.

20 Claims, 10 Drawing Sheets

FIG. 8A, FIG. 8B, FIG. 8C, FIG. 8D

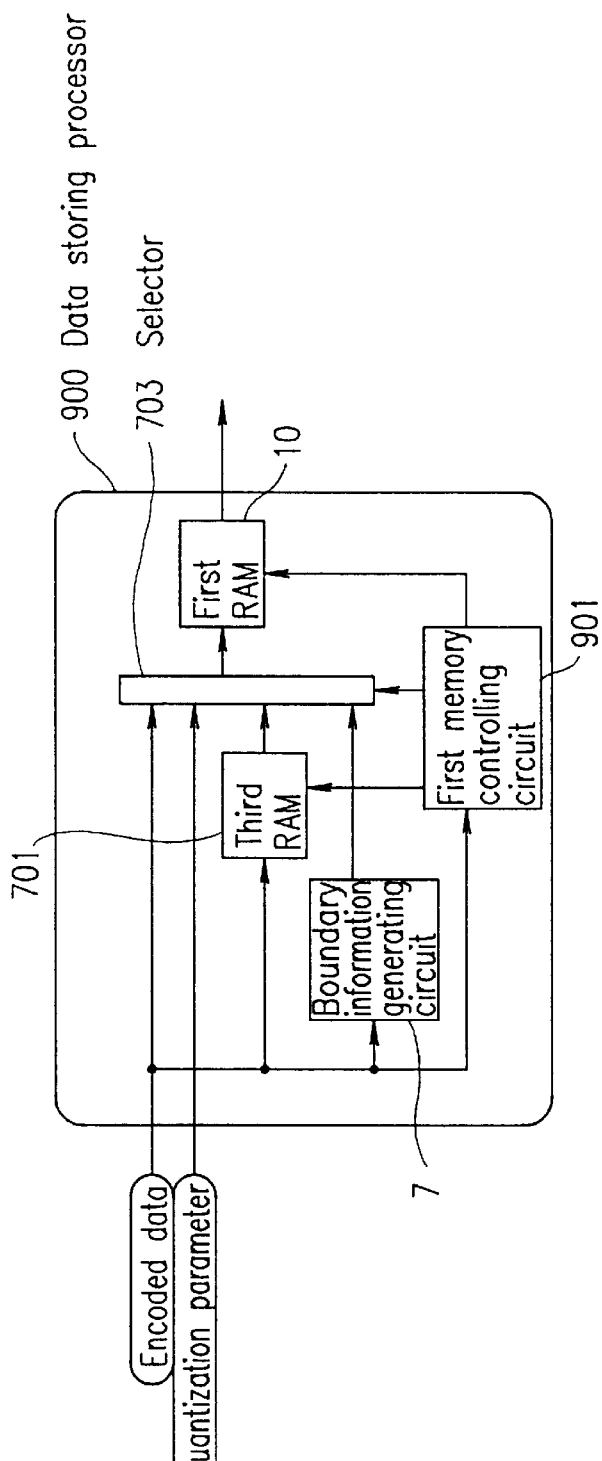
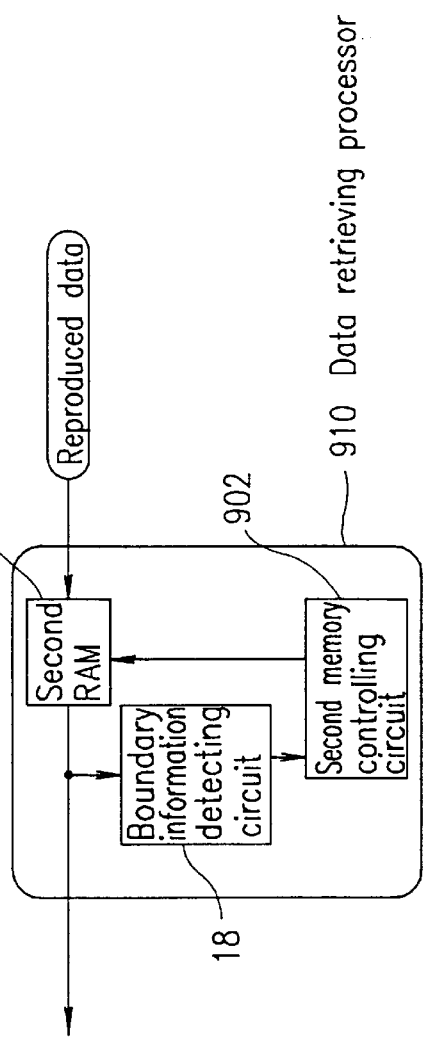
FIG. 9A
FIG. 9B

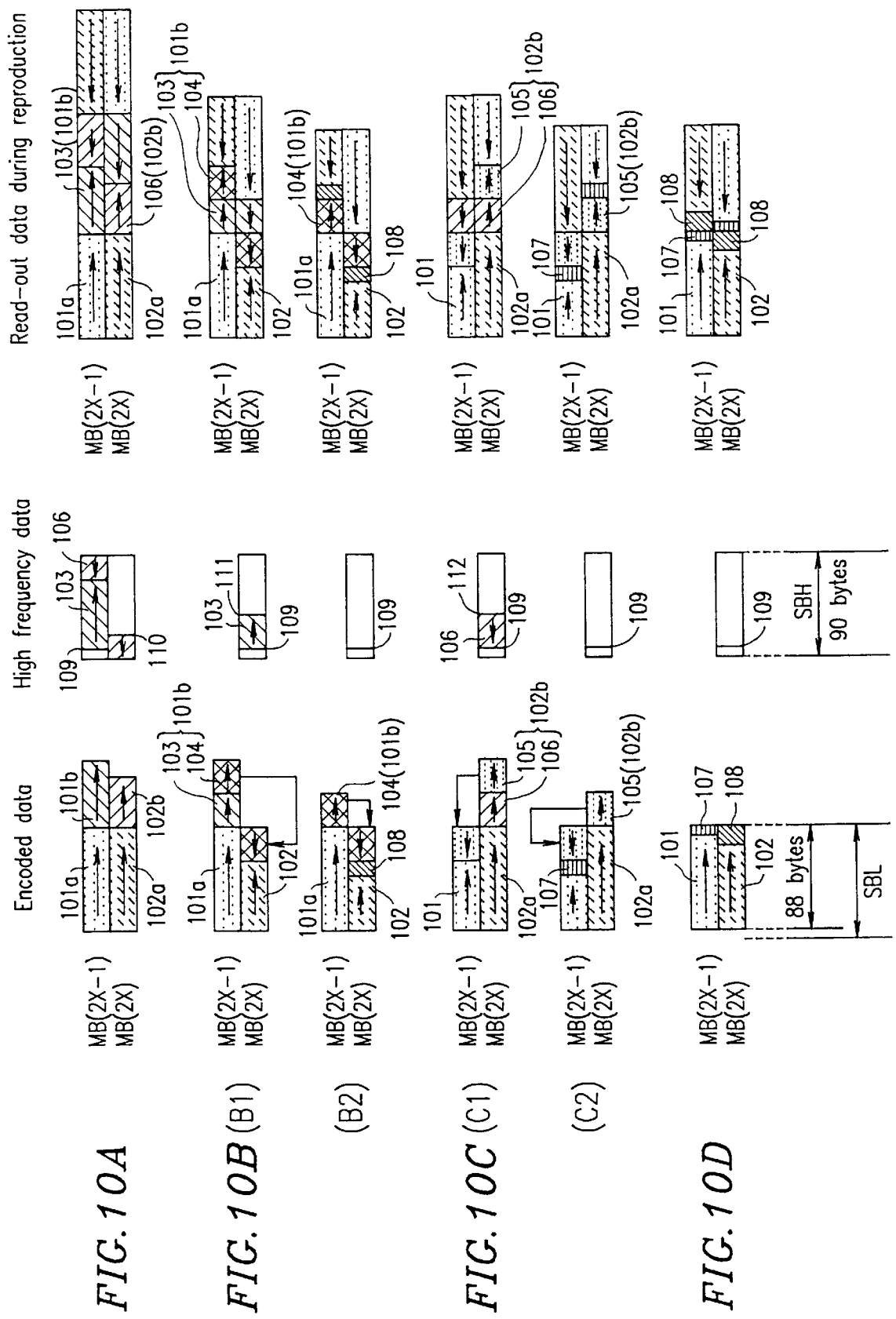

APPARATUS AND METHOD FOR IMAGE CODING AND RECORDING/REPRODUCING

BACKGROUND OF THE INVENTION

1. Field of the Invention

The present invention relates to an apparatus and a method for video data coding and recording/reproducing, in which data-compression of a video signal for a television system and the like is performed, the video signal being recorded in a recording medium such as a video tape recorder (VTR). Particularly, the present invention relates to a video data coding and recording/reproducing apparatus and method, in which a video signal is encoded using variable-length coding and is recorded in units of fixed-length sync blocks.

2. Description of the Related Art

Variable-length coding is a method typically used for efficient data-compression for digital signals. The variable-length coding encodes the data by assigning a code having a short length to the data with high occurrence probability and assigning a code having a long length to the data with low occurrence probability so that the average length of codes is reduced without distortions due to encoding.

In digital VTR, information is recorded on a recording medium (for example, a magnetic tape) in units of sync blocks with a fixed-length. Therefore, in order to record video signals which are encoded using variable-length coding, it is necessary to divide and arrange the data stream of the variable-length codes into fixed-lengths which are not related to the boundary between the two variable-length codes. Therefore, if the variable-length codes are simply continuously recorded in this manner, then while it is reproduced, it is necessary to successively decode the recorded encoded data one by one from the beginning. If the reproduced data include even a single erroneous bit, then it becomes impossible to decode all of the data after the erroneous code. Moreover, since the sync blocks on the recording track are not successively reproduced during high speed reproduction from a magnetic tape such as search reproduction, decoding is impossible except for those sync blocks which include the beginning of the data stream of variable-length codes, and excellent search pictures cannot be obtained.

Typically, a recording of video signals is performed as follows in a conventional image coding and recording/reproducing apparatus (for example, Technical Report of the Institute of Television Engineers of Japan, Vol. 16, No. 35, pages 7–12). First, transformation blocks are generated by dividing the video signals into blocks, and a discrete cosine transform (DCT) is performed on each of the transformation blocks. Then, variable-length coding is performed in units of macro blocks each of which consists of a plurality of transformation blocks. During the encoding, the amount of codes is controlled in such a manner that the amount of codes for each M number of macro blocks is equal to or less than M times the inner data length at the error correcting code. Therefore, the mean code amount of the M number of macro blocks is equal to or less than the inner data length.

The variable-length encoded data are successively stored in the inner data storage region for every macro block, starting with the DC and low frequency components. When the code amount of the variable-length encoded data of a certain macro block is larger than the inner data length, high frequency components of the encoded data which overflow and cannot be stored in the corresponding inner data storage region are stored in a vacant region of another inner data storage region which stores a macro block whose code amount is smaller than the inner data length. Therefore, as to the M number of macro blocks, the encoded data are stored in the prescribed inner data region assigned to the M number of macro blocks, and the packing of variable-length codes completes for every M number of macro blocks (i.e., the packing is performed in units of M number of macro blocks).

In the above method, since recording locations for the DC component or the low frequency components are fixed for every macro block, the error propagation can be contained within one macro block in the case of low frequency components and within one packing unit, i.e., within the M number of macro blocks in the case of the high frequency components. Moreover, since the sync block is made of a plurality of inner data, even during the search, search pictures can be obtained by decoding the DC and low frequency components of each macro block in units of inner data within the reproduced sync block.

Generally, the larger the range of control over the code amount is, the more precisely the bit assignment for each macro block is performed, resulting in the improvement in a picture quality of a reproduced image.

However, as described above, the conventional image coding and recording/reproducing apparatus divides the encoded data of each macro block into the low frequency data which are to be stored in the predetermined inner data storage region and the high frequency data to be stored in the vacant region of the inner data storage region assigned to another macro block within the code amount control range, and the apparatus stores the divided data accordingly. Therefore, during the reproduction of the video data, it is necessary to detect the storage location of the high frequency data of each macro block for every code amount control range and to line up and decode the corresponding encoded data based on the detected storage location. In order to detect the storage location of the high frequency data, it is necessary to perform the decoding on each inner data and to temporarily store in memory the end of the encoded data of each macro block. Therefore, if the code amount control range is widened, the range over which the high frequency data storage location is looked for increases, resulting in an increase in the size of hardware needed for the decoding processor and in the process time.

SUMMARY OF THE INVENTION

According to one aspect of the present invention, an image coding and recording/reproducing apparatus for encoding video signals using variable-length coding and for recording the video signals in units of fixed-length sync blocks includes: an orthogonal transform unit for performing an orthogonal transform on each transformation block including a plurality of pixels and for obtaining orthogonal transform coefficients for each transformation block; a coding processor for generating encoded data for each encoding group including a plurality of the transformation blocks, the encoded data being obtained by variable-length encoding the orthogonal transform coefficients of each transformation block and by arranging the resultant encoded transform coefficients in the order of increasing component frequency starting with a low frequency component; a storing processor for dividing a plurality of the sync blocks into low frequency sync blocks and high frequency sync blocks, each of the low frequency sync blocks being assigned with one of the encoding groups, a first portion of the encoded data of the encoding group being stored in the corresponding low frequency sync block from a beginning to an Lth bit, a second portion of the encoded data at a (L+1)th bit and beyond being stored in the high frequency sync blocks in a prescribed order; and a recording unit for recording the low frequency sync blocks and the high frequency sync blocks which store the encoded data therein on a recording medium.

In one embodiment of the present invention, the storing processor includes means for storing location information for the encoded data of the encoding group in a predetermined region in the low frequency sync block to which the encoding group is assigned, the location information indicating a location of the portion of the encoded data at the (L+1)th bit and beyond, the location being in the high frequency sync block.

In one embodiment of the present invention, the storing processor includes: means for holding the second portion of the encoded data of each encoding group at the (L+1)th bit and beyond in the high frequency sync block, the encoding group being one of K number of encoding groups assigned to K number of low frequency sync blocks; and means for placing location information indicating a location of the storage of the second portion in the K number of low frequency sync blocks, the location information being equally divided and assigned among the K number of low frequency sync blocks.

In one embodiment of the present invention, a data packing is performed in units of two successive encoding groups, where: respective first portions of encoded data of a first and second encoding groups, which are from a beginning to an Lth bit at the most, are stored as first data in a corresponding first and second low frequency sync blocks, respectively; in a case where a code amount of the second encoding group is less than L bits, a second portion of the encoded data of the first encoding group at the (L+1)th bit and beyond, which can be stored in a vacant region from an end thereof in the second low frequency sync block to which the second encoding group is assigned, is stored as second data in the vacant region of the second low frequency sync block in an opposite direction from the end; and in a case where a code amount of the first encoding group is less than L bits, a part of the second portion of the encoded data of the second encoding group at the (L+1)th bit and beyond is stored as third data in a vacant region of the first low frequency sync block to which the first encoding group is assigned. The storing unit further comprising: a first storing means for storing portions of the encoded data of the first and second encoding groups other than the first, second and third data in the high frequency sync block as fourth data; and a second storing means for storing location information in the first and second low frequency sync blocks to which the first and second encoding groups are assigned, the location information indicating a location of storage of the fourth data within the high frequency sync block.

In one embodiment of the present invention, the encoded data are decoded starting with the first encoding group in units of the data packing units.

In one embodiment of the present invention, the third data are stored in the vacant region of the first low frequency sync block from the (L+1)th bit of the encoded data of the second encoding group.

In one embodiment of the present invention, the first storing means successively and continuously stores the fourth data of a predetermined number of the data packing unit from a beginning of the high frequency sync blocks corresponding to the predetermined number of the packing unit; the location information of the fourth data in the Pth data packing unit (P is an integer equal to or greater than 2) indicates a start address of an available region of the high frequency sync blocks, where no data have been stored in the available region yet, when a storage of encoded data of a (P−1)th data packing unit is completed; and the location information of the fourth data of the first data packing unit indicates an address at which the end of the fourth data is stored when a storage of the encoded data of the predetermined number of the data packing units is completed.

In one embodiment of the present invention, the third data are stored in the vacant region of the first low frequency sync bock in an opposite direction from the end of the second portion of the second encoding group at the (L+1)th bit and beyond, and the first storing means successively arranges the data of the first encoding group included in the fourth data from the beginning thereof, and the data of the second encoding group included in the fourth data in an opposite direction from an end thereof, when the fourth data are stored in the high frequency sync blocks.

In one embodiment of the present invention, the recording unit records data so that the low frequency sync blocks and the high frequency sync blocks are alternately disposed in the order of data storage with an approximate ratio of numbers of the low frequency sync blocks and the high frequency sync blocks, the numbers being determined by the storing processor.

In one embodiment of the present invention, the recording unit records data so that the low frequency sync blocks and the high frequency sync blocks are alternately disposed in the order of data storage with an approximate ratio of numbers of the low frequency sync blocks and the high frequency sync blocks, the numbers being determined by the storing processor.

According to another aspect of the present invention, an image coding and recording/reproducing method for encoding video signals using variable-length coding and for recording the video signals in units of fixed-length sync blocks includes the steps of: performing an orthogonal transform on each transformation block including a plurality of pixels and obtaining orthogonal transform coefficients for each transformation block; generating encoded data for each encoding group including a plurality of the transformation blocks, the encoded data being obtained by variable-length encoding the orthogonal transform coefficients of each transformation block and by arranging the resultant encoded transform coefficients in the order of increasing component frequency starting with a low frequency component; storing data by dividing a plurality of the sync blocks into low frequency sync blocks and high frequency sync blocks, assigning each of the low frequency sync blocks to a respective one of the encoding groups, storing a first portion of the encoded data of the encoding group from a beginning to an Lth bit in the corresponding low frequency sync block, and storing a second portion of the encoded data at a (L+1)th bit and beyond in the high frequency sync blocks in a prescribed order; and recording the low frequency sync blocks and the high frequency sync blocks storing the encoded data therein on a recording medium.

In one embodiment of the present invention, the step of storing data includes the step of storing location information for the data of the encoding group in a predetermined region in the low frequency sync block to which the encoding group is assigned, the location information indicating a location of the portion of the encoded data at the (L+1)th bit and beyond, the location being in the high frequency sync block.

In one embodiment of the present invention, the step of storing data includes the steps of: holding the second portion of the encoded data of each encoding group at the (L+1)th bit and beyond in the high frequency sync block, the encoding group being one of K number of encoding groups assigned to K number of low frequency sync blocks; and placing location information indicating a location of the storage of the second portion in the K number of low frequency sync blocks, the location information being equally divided and assigned among the K number of low frequency sync blocks.

In one embodiment of the present invention, a data packing is performed in units of two successive encoding groups in the step of storing data. The step of storing data includes the steps of: (a) storing respective first portions of encoded data of a first and second encoding groups as first data in a corresponding first and second low frequency sync blocks, respectively, in each data packing unit, each first portion being from a beginning to an Lth bit at the most; (b) in a case where a code amount of the second encoding group is less than L bits, storing a second portion of the encoded data of the first encoding group at the (L+1)th bit and beyond, which can be stored in a vacant region from an end thereof in the second low frequency sync block to which the second encoding group is assigned, as second data in the vacant region of the second low frequency sync block in an opposite direction from the end; (c) in a case where a code amount of the first encoding group is less than L bits, storing a part of the second portion of the encoded data of the second encoding group at the (L+1)th bit and beyond as third data in a vacant region of the first low frequency sync block to which the first encoding group is assigned; (d) storing portions of the encoded data of the first and second encoding groups other than the first, second and third data in the high frequency sync block as fourth data; and (e) storing location information in the first and second low frequency sync blocks to which the first and second encoding group are assigned, the location information indicating a location of storage of the fourth data within the high frequency sync block.

In one embodiment of the present invention, an image coding and recording/reproducing method includes the step of decoding the encoded data starting with the first encoding group in units of the data packing during reproduction.

In one embodiment of the present invention, the third data are stored in the vacant region of the first low frequency sync block from the (L+1)th bit of the encoded data of the second encoding group in the step (c).

In one embodiment of the present invention, in the step of storing data: the fourth data of each encoding group in a predetermined number of the data packing unit are successively and continuously stored from the beginning of the high frequency sync blocks corresponding to the predetermined numbers of the data packing unit; the location information of the fourth data in the Pth data packing unit (P is an integer equal to or greater than 2) indicates a start address of an available region of the high frequency sync blocks, where no data have been stored in the available region yet, when a storage of encoded data of a (P−1)th data packing unit is completed; and the location information of the fourth data of the first data packing unit indicates an address at which the end of the fourth data is stored when a storage of the encoded data of the predetermined number of the data packing units is completed.

In one embodiment of the present invention, in the step (c), the third data are stored in the vacant region of the first low frequency sync bock in an opposite direction from the end of the second portion of the second encoding group at the (L+1)th bit and beyond, and in the step (d), the data of the first encoding group included in the fourth data are successively arranged from the beginning thereof, and the data of the second encoding group included in the fourth data are successively arranged in an opposite direction from an end thereof, when the fourth data are stored in the high frequency sync blocks.

In one embodiment of the present invention, in the step of recording data, the recording is performed so that the low frequency sync blocks and the high frequency sync blocks are alternately disposed in the order of data storage with an approximate ratio of numbers of the low frequency sync blocks and the high frequency sync blocks, the numbers being determined in the step of storing processor.

In one embodiment of the present invention, in the step of recording data, the recording is performed so that the low frequency sync blocks and the high frequency sync blocks are alternately disposed in the order of data storage with an approximate ratio of numbers of the low frequency sync blocks and the high frequency sync blocks, the numbers being determined in the step of storing processor.

Thus, the invention described herein makes possible the advantage of providing an image coding and recording/reproducing apparatus capable of reproducing encoded data which are controlled for code amount over a wide range using a simpler decoding processor.

These and other advantages of the present invention will become apparent to those skilled in the art upon reading and understanding the following detailed description with reference to the accompanying figures.

BRIEF DESCRIPTION OF THE DRAWINGS

Figures 8A, 8B, 8C, 8D:
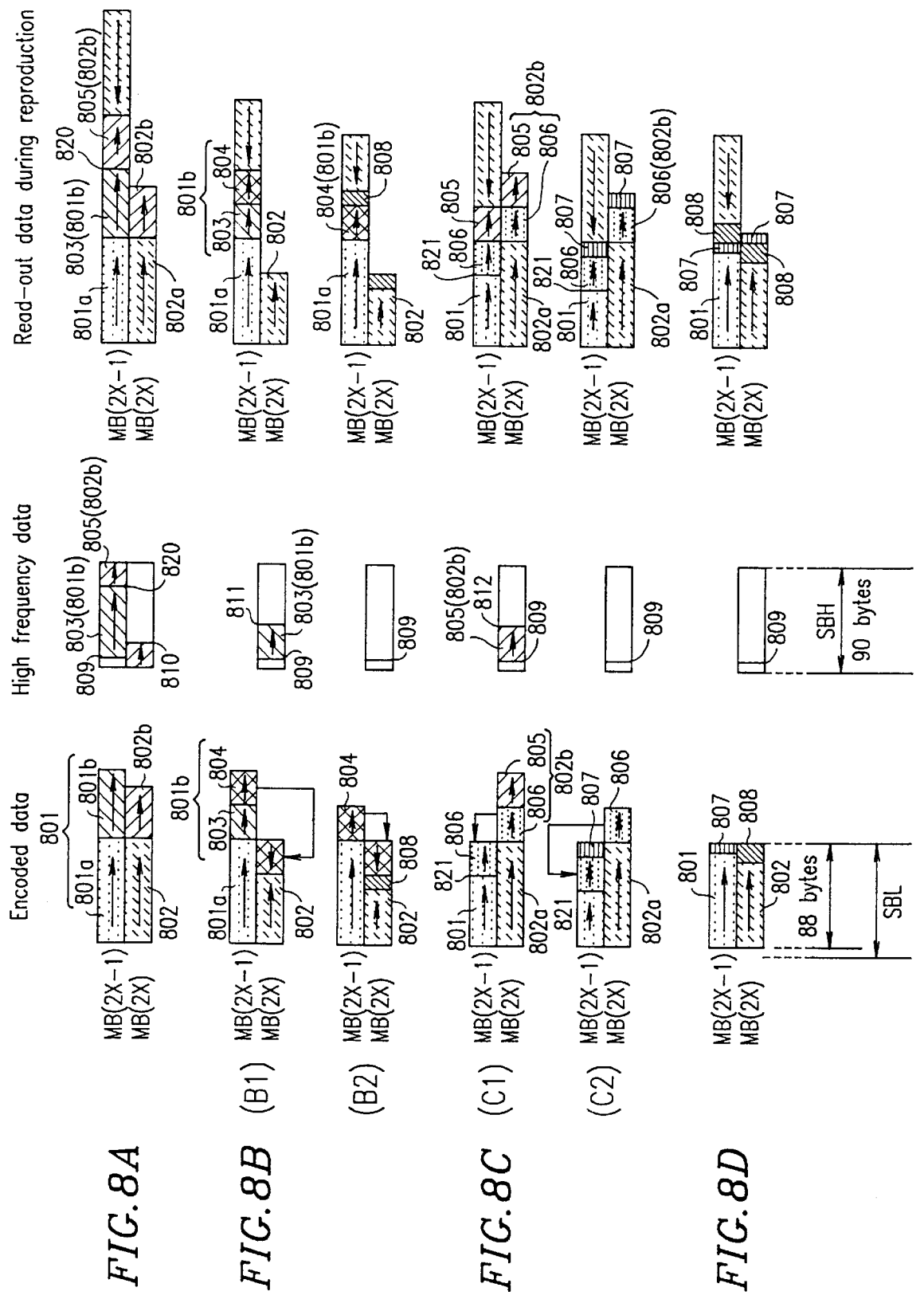

FIGS. 8A–8D are conceptual diagrams illustrating storing and retrieving methods for encoded data performed in units of encoding groups in the image coding and recording/reproducing apparatus according to the second example of the present invention.

FIGS. 9A and 9B are block diagrams illustrating the structures of a data storing processor and data retrieving processor in an image coding and recording/reproducing circuit according to a third example of the present invention.

FIGS. 10A, 10B, 10C and 10D are conceptual diagrams illustrating storing and retrieving methods for encoded data performed in units of encoding groups in the image coding and recording/reproducing apparatus according to the third example of the present invention.

DESCRIPTION OF THE PREFERRED EMBODIMENTS

Hereinafter, an image coding and recording/reproducing apparatus according to the present invention will be described in the following examples with reference to attached figures.

EXAMPLE 1

Figure 1:
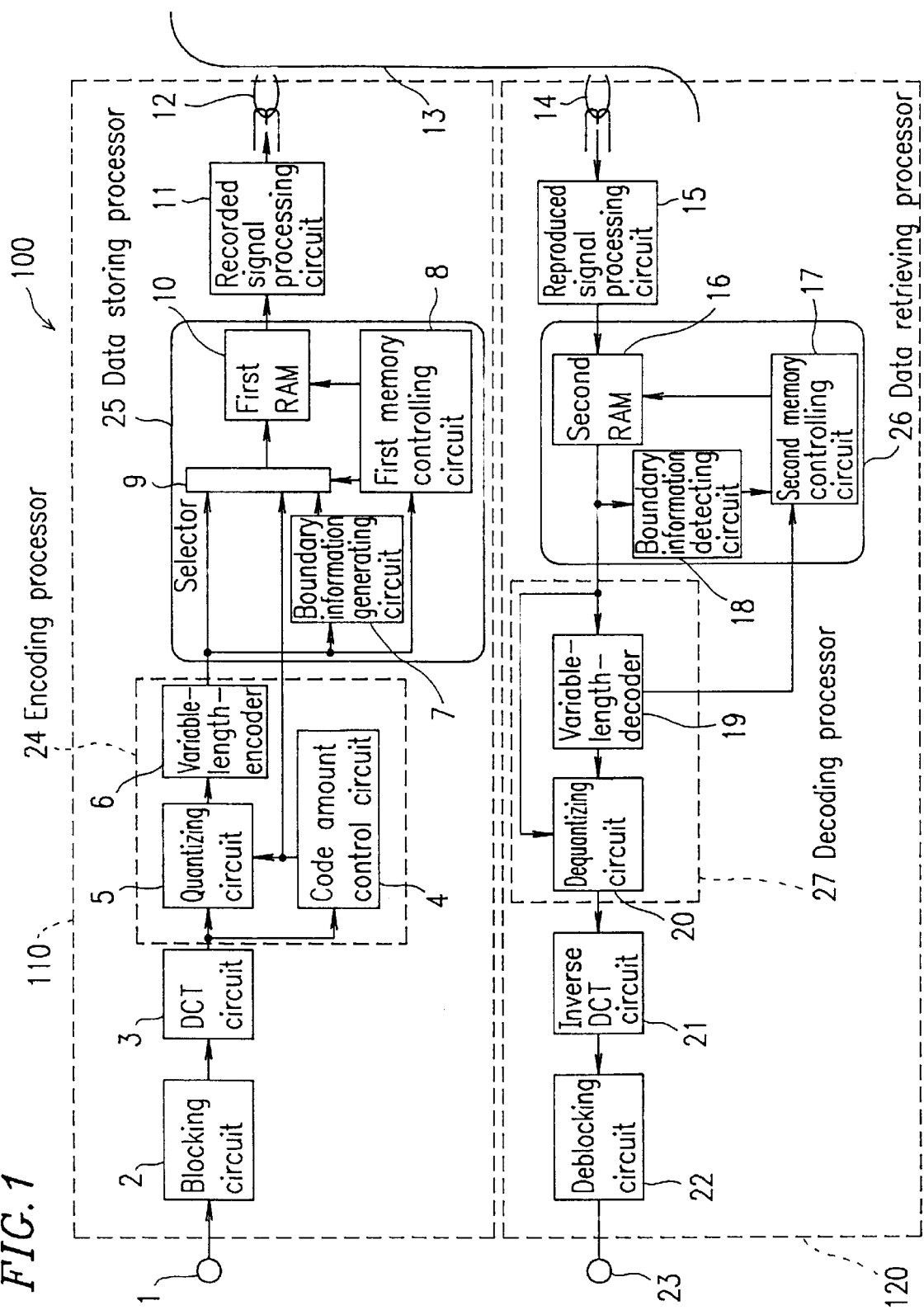
FIG. 1 is a block diagram illustrating the structure of an image coding and recording/reproducing apparatus according to a first example of the present invention.

FIG. 1 is a block diagram illustrating the overall structure of an image coding and recording/reproducing apparatus 100 according to a first example of the present invention. As illustrated in FIG. 1, the image coding and recording/reproducing apparatus 100 has a recording unit 110 and a reproducing unit 120. The recording unit 110 includes a digital video signal input terminal 1, a blocking circuit 2, an orthogonal transform circuit (DCT circuit) 3, an encoding processor 24, a data storing processor 25, a recorded signal processing circuit 11, and a recording head 12 for recording signals onto a recording medium 13. The reproducing unit 120 includes a reproducing head 14 for retrieving signals from the recording medium 13, a reproduced signal processing circuit 15, a data retrieving processor 26, a decoding processor (decoder) 27, an inverse orthogonal transform circuit (inverse DCT circuit) 21, a deblocking circuit 22, and a digital video signal output terminal 23.

As illustrated in FIG. 1, the encoding processor 24 has a code amount control circuit 4, a quantizing circuit 5 and a variable-length-encoder 6. The data storing processor 25 includes a boundary information generating circuit 7, a first memory controlling circuit 8, a selector 9 and a first RAM 10. Moreover, the data retrieving processor 26 includes a second RAM 16, a second memory controlling circuit 17 and a boundary information detecting circuit 18, and the decoding processor 27 includes a variable-length-decoder 19 and a dequantizing circuit 20.

Hereinafter, the operation of the image coding and recording/reproducing apparatus 100 according to the present example will be described. In the present example, an input video signal is a 4:2:2 component signal such that on one field, sampling of 720 pixels horizontally and 256 pixels vertically is performed for a luminance signal (Y), and half the above-described sampling is performed for each of the color difference signals (Pb and Pr). Moreover, one field of the video signal is divided into two channels. The video signal is quantized using a quantization parameter which makes the code amount equal to or less than a prescribed amount, and then the signal is variable-length-encoded and recorded on the recording medium. A video signal recording region for the one channel is made of 1080 sync blocks, and the size of the data region in one sync block is 90 bytes. Hereinafter, the process for one channel will be described.

Figure 2:
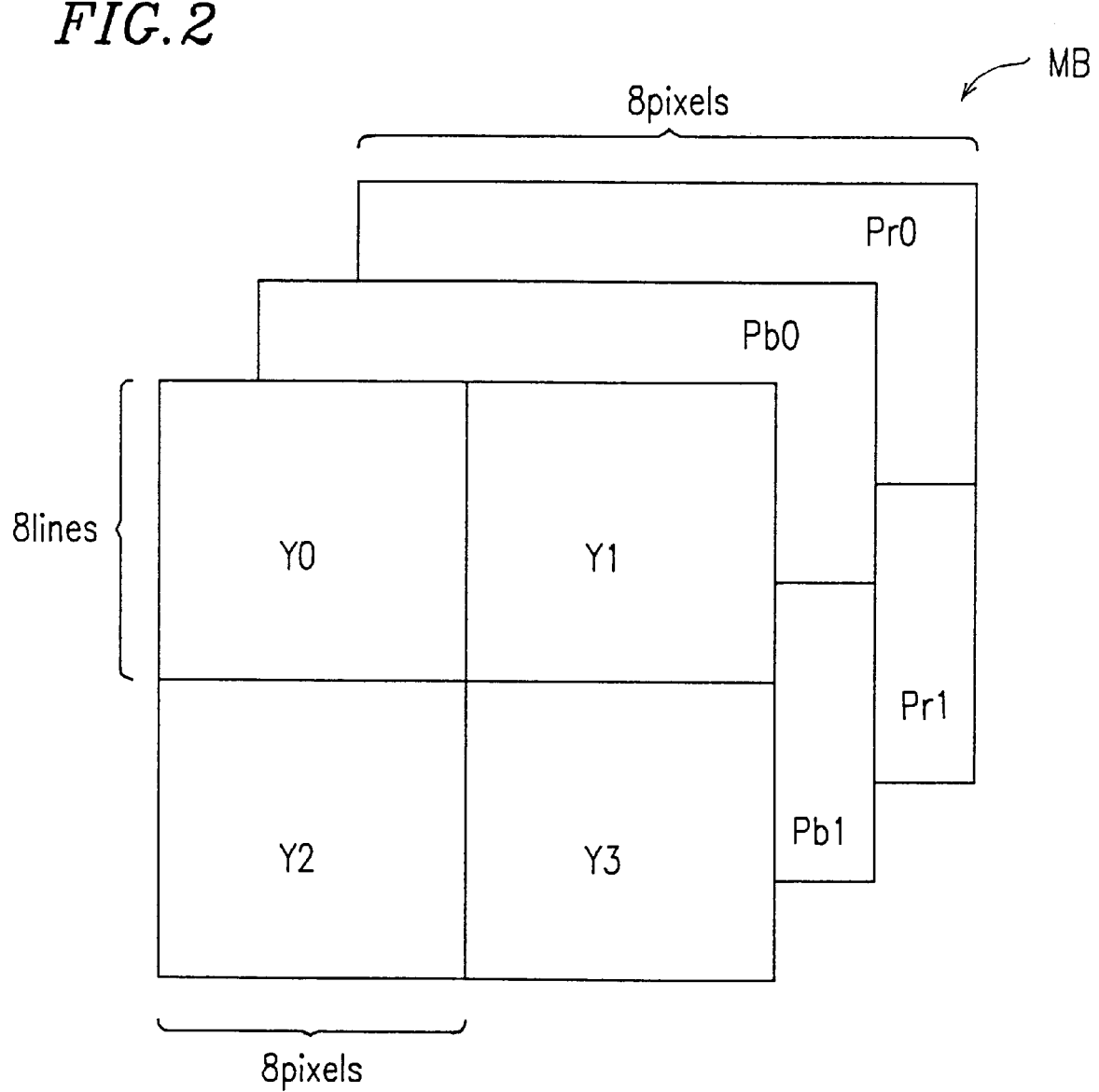
FIG. 2 is a diagram illustrating a coding group in the image coding and recording/reproducing apparatus according to the first example of the present invention.

The input video signal (4:2:2 component signal) is input to the recording unit 110 from the digital video signal input terminal 1. The input video signal is divided into 8-lines-by-8-pixels DCT blocks by the blocking circuit 2 independently with respect to the luminance signal Y (referred to as the Y signal hereinafter), the color difference signal Pb (referred to as the Pb signal hereinafter), and the color difference signal Pr (referred to as the Pr signal). Therefore, as to the one field of video signal, the Y signal is divided into 1440 DCT blocks per channel, and the Pb signal and the Pr signal are divided into 720 DCT blocks per channel, respectively. Furthermore, as illustrated in FIG. 2, one encoding group MB is formed with eight DCT blocks, namely those four DCT blocks (Y0, Y1, Y2 and Y3) of the Y signal adjacent to one another in the above/below and left/right directions on an image screen and the two DCT blocks for each of the Pb signal and the Pr signal (Pb0, Pb1, Pr0 and Pr1), both of which are at the same corresponding location as the four DCT blocks of the Y signal. The variable-length-encoding is performed in units of these encoding groups MB. One channel includes 360 encoding groups MB.

The video signal which is divided into DCT blocks is input to the orthogonal transformation circuit (orthogonal transformer) 3. Although DCT is used as an orthogonal transform in the present example, this does not limit the scope of the present invention. Other orthogonal transforms (for example, discrete sine transform, Hadamard transform, Harr transform, Slant transform, etc.) can be used. In the following, the description will be given of the case where the DCT circuit 3 is used as an orthogonal transformation circuit. The DCT circuit 3 performs DCT for every DCT block to obtain orthogonal transformation coefficients, and supply these coefficients to the encoding processor 24 as DCT coefficient data.

The DCT coefficient data input to the encoding processor 24 are supplied to the code amount control circuit 4 and the quantizing circuit 5. The code amount control circuit 4 first predicts an initial value of the quantization parameter, which makes the amount of codes per one channel equal to or less than the target amount of codes, using data sampled from the one channel's worth of DCT coefficient data. Then, the code amount control circuit 4 watches the amount of codes after the variable-length-encoding, and changes the quantization parameters whenever necessary so as not to exceed the target amount of codes. The quantization parameters are selected from the 256 different kinds. The quantization parameter selected by the code amount control circuit 4 is given to the quantizing circuit 5.

The quantizing circuit 5 quantizes the DCT coefficient data supplied from the DCT circuit 3 based on the selected quantization parameter. The quantized coefficient data are sent to the variable-length-encoder 6.

Figure 3:
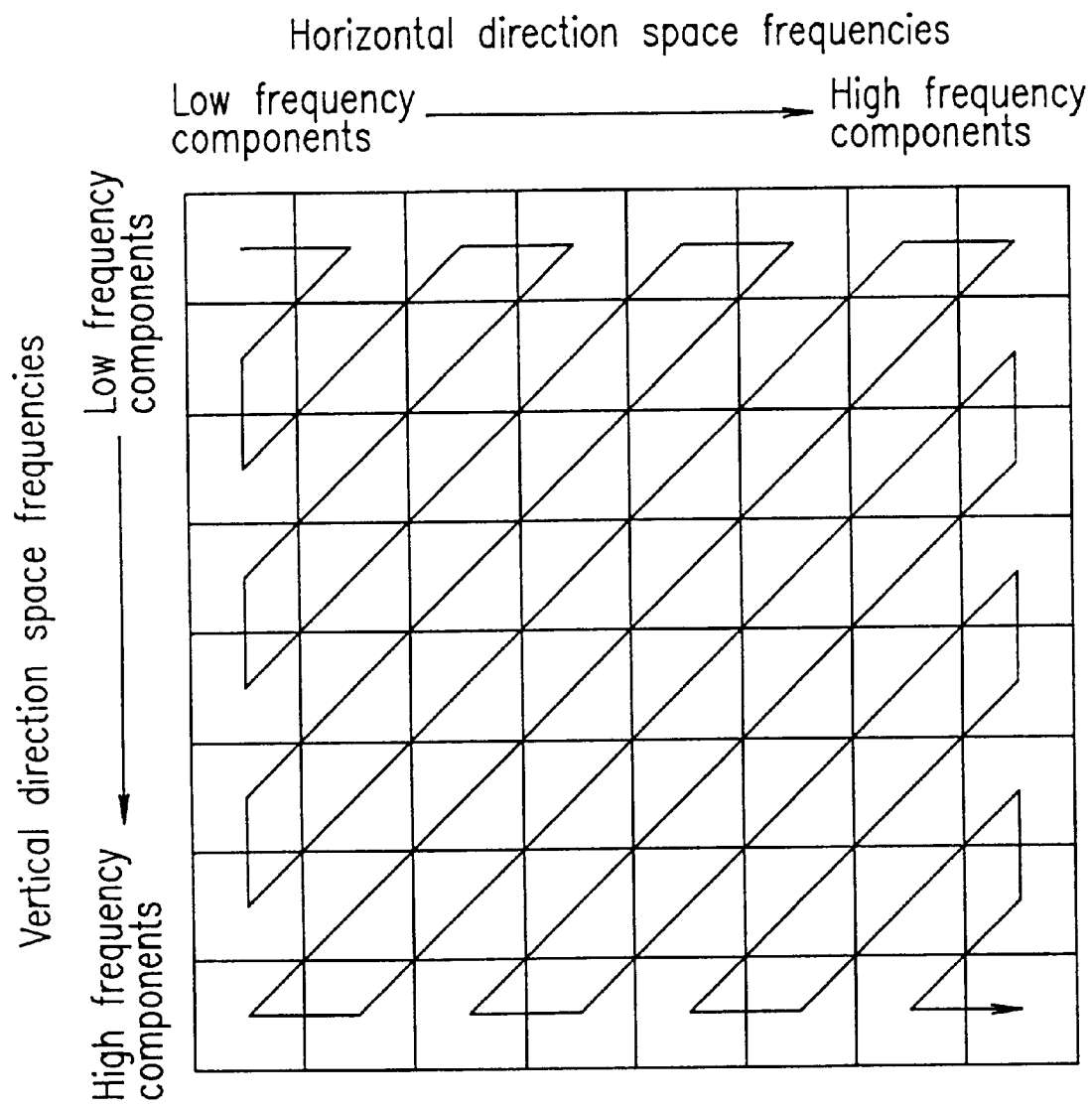
FIG. 3 is a diagram illustrating a zigzag scanning in the image coding and recording/reproducing apparatus according to the first example of the present invention.

The variable-length-encoder 6 performs zigzag scanning on the quantized coefficient data for each DCT block as illustrated in FIG. 3 and successively lines up the quantized coefficient data with respect to horizontal direction space frequencies and vertical direction space frequencies in the order of increasing frequencies starting with the low frequency (DC) component. Then, the variable-length-encoder 6 successively transforms the quantized coefficient data into variable-length codes starting with the low frequency component by two-dimensional Huffman coding, in which one code is assigned to the number of successive zeroes (ranlength) and non-zero value following thereafter. FIGS. 4A–4H illustrate one example of variable-length-encoded data for eight DCT blocks included in one encoding group MB, i.e., Y0, Y1, Y2, Y3, Pb0, Pb1, Pr0 and Pr1 (refer to FIG. 2).

Figure 4A:
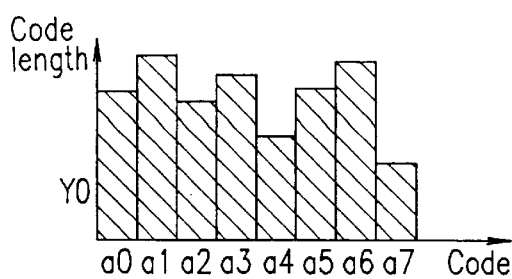
FIGS. 4A–4I are diagrams illustrating packing method for variable-length-encoded data of the encoding group shown in FIG. 2.

In FIG. 4A, a0, a1, . . . , a7 represent the result of encoding the DCT block Y0, where a0 represents the DC component and a1 to a7 represent other components with increasing frequencies starting with the low frequency component.

Figure 4E:
Figure 4B:
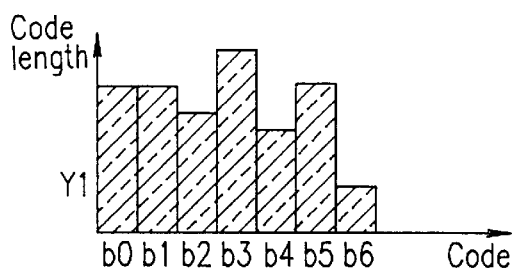
Figure 4F:
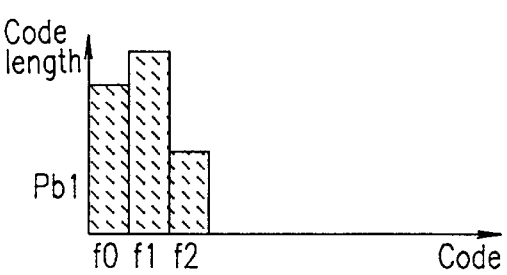
Figure 4C:
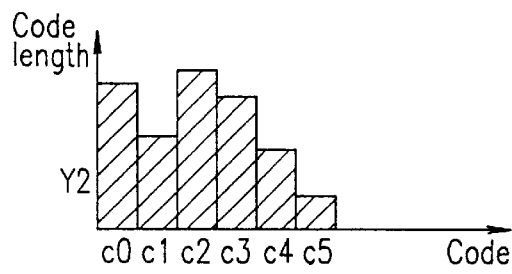
Figure 4G:
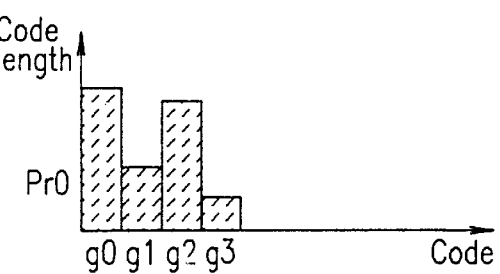
Figure 4D:
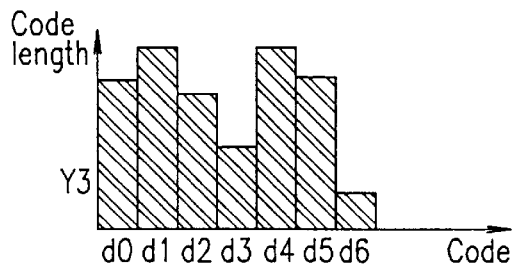
Figure 4H:
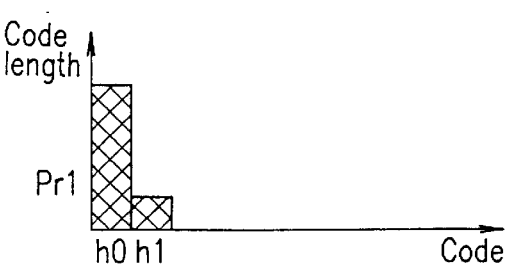

Similarly, FIG. 4B illustrates the encoding result b0, b1, . . . , b6 for Y1, and FIG. 4C illustrate the encoding result c0, c1, . . . , c5 for Y2. FIG. 4D illustrates the encoding result d0, d1, . . . , d6 for Y3, and FIG. 4E illustrates the encoding result e0, e1, e2 and e3 for Pb0. Furthermore, FIG. 4F illustrates the encoding result f0, f1 and f2 for Pb1; FIG. 4G illustrates the encoding result g0, g1 and g2 for Pr0; and FIG. 4H illustrates the encoding result h0 and h1 for Pr1. In FIGS. 4A–4H, the height of the encoding result represents the code length. Since the two-dimensional Huffman coding is employed, the number and the length of codes differ for each DCT block as illustrated in FIGS. 4A–4H.

The variable-length-encoder 6 picks up the variable-length-encoded data of each DCT block in the encoding group MB by one code at a time starting with the low frequency component in a prescribed order (i.e., in the order of Y0, Y1, Y2, Y3, Pb0, Pb1, Pr0, Pr1, Y0, Y1, Y3, . . . and so on) and successively lines them up. Then, the variable-length-encoded data are output in units of one byte. In the example illustrated in FIGS. 4A–4H, the variable-length-encoded data of each DCT block are picked up by one code at a time in the order of a0, b0, c0, d0, e0, f0, g0, h0, a1, b1, c1, ... and so on, starting with the code of the lowest frequency component. The picked encoded data are successively lined up in this order.

Figure 4I:
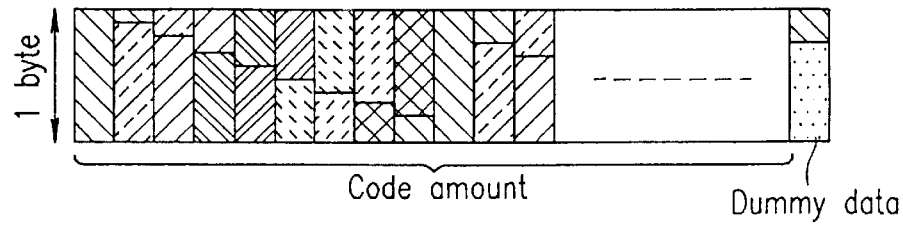

FIG. 4I illustrates the variable-length-encoded data 400 corresponding to one encoding group MB output from the variable-length-encoder 6. As illustrated in FIG. 4I, since the variable-length-encoded data are output by one byte at a time, dummy data of less than one byte are added at the end of the encoded data of each encoding group so that the amount of code for the one encoding group becomes an integral multiple of one byte.

Figure 5A:
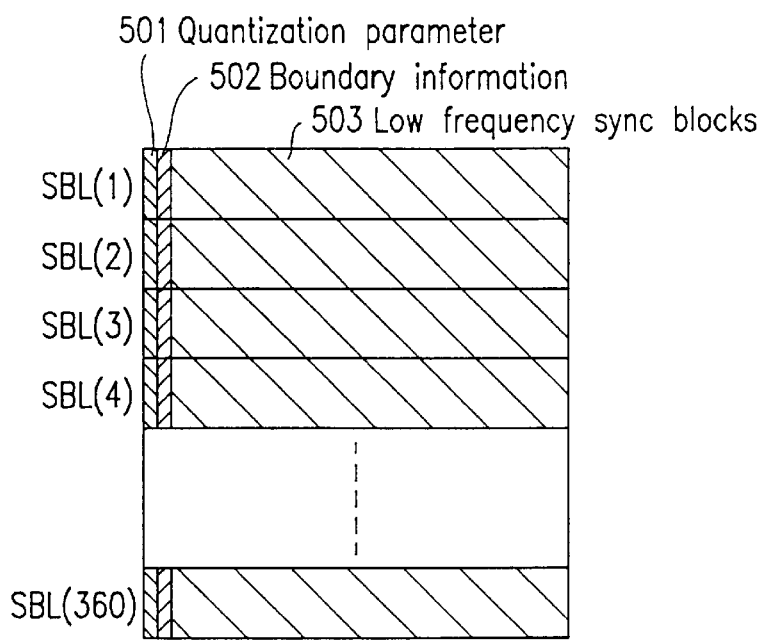
FIGS. 5A and 5B are diagrams illustrating the structure of the recording sync blocks (low frequency sync blocks and high frequency sync blocks) of the encoded data for one channel in the image coding and recording/reproducing apparatus according to the first example of the present invention.
Figure 5B:
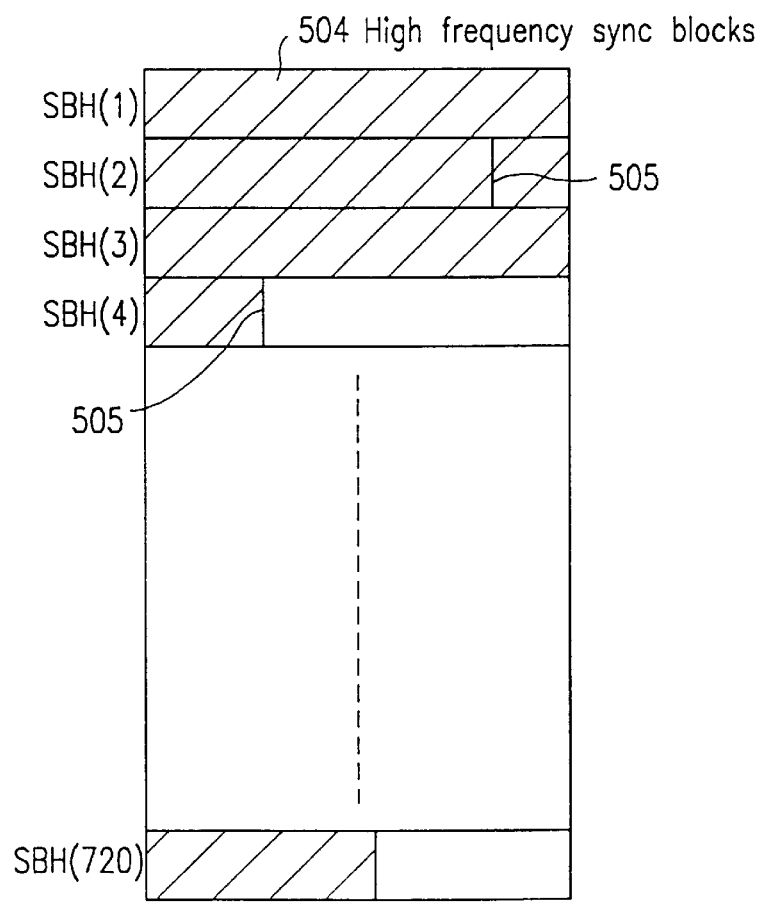

FIGS. 5A and 5B illustrate data storage regions and stored data in 1080 sync blocks for recording one channel's worth of video signals. As illustrated in FIGS. 5A and 5B, the 1080 sync blocks are divided into 360 low frequency sync blocks SBL(1) to SBD(360) and 720 high frequency sync blocks SBH(1) to SBH(720). Each sync block has a length of 90 bytes. Incidentally, the numbers of the low frequency and high frequency sync blocks when dividing the sync blocks and the length of the sync block described above do not limit the scope of the present invention, as these numbers are arbitrarily chosen, and any suitable numbers may be substituted therefor.

As illustrated in FIGS. 5A and 5B, the low frequency sync blocks SBL store the quantization parameter 501, the boundary information 502 and the low frequency data 503, and the high frequency sync blocks SBH store the high frequency data 504. Reference numeral 505 designates a boundary between high frequency data for every two encoding groups. The quantization parameter 501 indicates one of 256 different kinds of quantization parameters, which is used for the encoding group MB, and is expressed in eight bits. The quantization parameter 501 is stored in each low frequency sync block SBL.

As to be described in detail later, one low frequency sync block SBL is assigned to the variable-length-encoded data 400 of one encoding group. The variable-length encoded data 400 of one encoding group are stored in the corresponding low frequency sync block SBL starting with the low frequency component (low frequency data 503). When the amount of codes in the variable-length-encoded data 400 for one encoding group is large and, therefore, cannot be stored in the storage regions of the low frequency sync blocks SBL, the portion of the variable-length-encoded data 400 which cannot be stored in the low frequency sync blocks SBL is stored in the high frequency sync blocks SBH (high frequency data 504) in the order of the encoding groups. That is, the high frequency data 504 are successively stored in the high frequency sync blocks SBH(1), SBH(2) . . . and so on.

In the present example, the data packing is performed in units of two encoding groups, and the high frequency data boundary 505 is provided for every two encoding groups. That is, the high frequency data boundary 505 serves as a leading address for the two encoding groups' worth of high frequency data stored in the high frequency sync blocks SBH. The boundary information 502 indicating the high frequency data boundary 505 is divided and stored in the two low frequency sync blocks SBL corresponding to the two encoding groups. Since the encoded data are stored in units of bytes, the boundary information 502 indicates the byte address in the data recording region of the high frequency sync blocks SBH. Since there are 720 high frequency sync blocks, each of which includes 90 bytes, the boundary information 502 can be expressed in 16 bits. Therefore, the boundary information 502 is stored in two low frequency sync blocks SBL such that each contains eight bits. As described above, the encoded data recording region in the low frequency sync block SBL has 88 bytes which is 90 bytes of data region of one sync block minus two bytes consisting of eight bits (one byte) for quantization parameter 501 and eight bits (one byte) for boundary information 502.

The above-described processes of storing the variable-length-encoded data in the sync blocks are performed by the data storing processor 25 as illustrated in FIG. 1. The boundary information 502 is generated by the boundary information generating circuit 7. The first RAM has the address space of the size which matches the size of one channel's worth of sync blocks (recording sync blocks) on a recording medium and temporarily stores one channel's worth of variable-length-encoded data 400, the quantization parameter 501 and the boundary information 502 (these 400, 501 and 502 are referred to as one channel write data). The first memory controlling circuit 8 controls write addresses of the selector 9 and the first RAM 10 based on the result of the variable-length-encoding for every encoding group MB. One channel write data to be recorded on the recording medium 13 are stored at the prescribed write addresses in the first RAM 10 corresponding to the high frequency and low frequency sync blocks illustrated in FIGS. 5A and 5B by the first memory controlling circuit 8.

After the one channel write data are written in the first RAM 10, the write data are read out to the recording signal processing circuit 11. The recording signal processing circuit 11 generates signals for recording by adding a synchronous code, an ID or an error correction code to the read-out data, by performing record modulation and the like. The signals for recording are recorded on the recording medium 13 through the recording head 12 in units of sync blocks.

Figure 6:
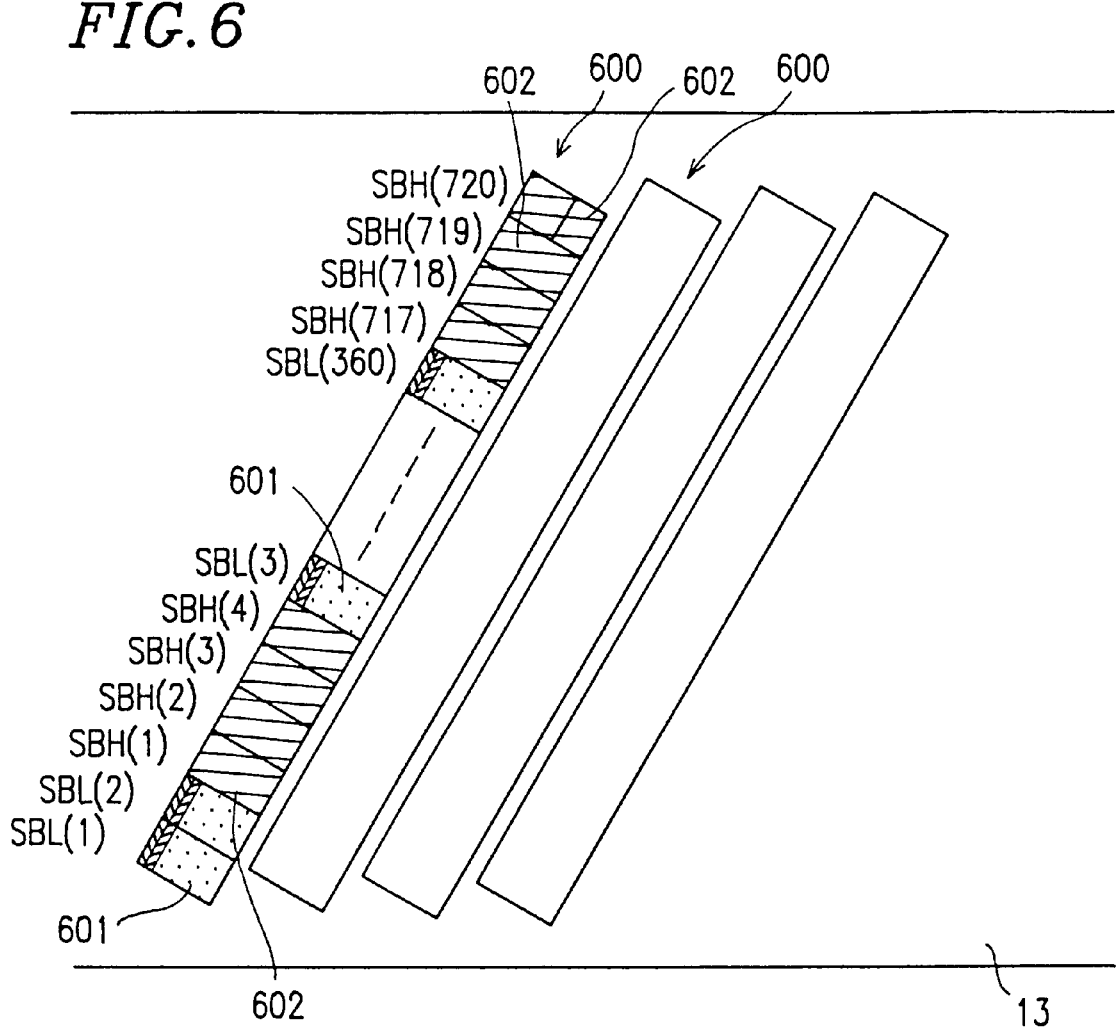
FIG. 6 is a diagram illustrating one example of a track pattern in which video data are recording by the image coding and recording/reproducing apparatus according to the first example of the present invention.

FIG. 6 illustrates one example of a track pattern of the recording of the video data on the recording medium 13. One track 600 is used to record the variable-length-encoded data of one channel's worth of video data. As illustrated in FIG. 6, each track 600 is provided with low frequency sync blocks 601 for recording the low frequency sync blocks SBL and high frequency sync blocks 602 for recording the high frequency sync blocks SBH. Here, the low frequency and high frequency sync blocks during the data storage processes are designated by the sync blocks SBL and SBH, respectively, and the low frequency and high frequency sync blocks recorded in the physical tracks on the recording medium 13 are designated by the sync blocks 601 and 602, respectively.

In the present example, since the data packing is performed in units of two encoding groups, a group consisting of two low frequency sync blocks 601 and a group of four high frequency sync blocks 602 are formed to be alternately disposed and recorded alternately in the order of data storage. As illustrated in FIG. 6, 360 low frequency sync blocks 601 and 720 high frequency sync blocks 602 are alternately disposed and recorded on one track 600 with a ratio of 1:2.

The above-described processes are for one channel's worth of the encoded data of one field of the video signals. The similar processes are performed on another channel of the video signals so as to be recorded in the next track 600. The similar processes are repeated on each field of the video signals to be recorded on the recording medium 13.

Next, the operation of the image coding and recording/reproducing apparatus 100 during reproduction will be described with reference to FIG. 1. During the reproduction, signals are reproduced from the recording medium 13 through the reproducing head 14. The reproduced signals are input to the reproduced signal processing circuit 15, where data are reproduced by reproduced signal processing such as reproduction equalization, demodulation, error correction and the like. The reproduced data are written in the second RAM 16 in the data retrieving processor 26.

The encoded data are read out in units of encoding groups MB from the second RAM 16 and input to the boundary information detecting circuit 18 and the variable-length-decoder 19. The boundary information detecting circuit 18 detects the boundary information 502 (refer to FIG. 5A) for high frequency data, which are split and stored in two low frequency sync blocks (referred to as the first low frequency sync block SBLa and the second low frequency sync block SBLb, respectively). The encoded data of the two encoding groups (referred to as the first encoding group MBa and the second encoding group MBb) corresponding to these two low frequency sync blocks SBLa and SBLb, respectively, are read out as follows.

As to the encoded data in the first encoding group MBa, data stored in the low frequency sync block SBLa are read out, and subsequently, the high frequency data recorded at addresses (in the high frequency sync block SBH) after the address indicated by the detected boundary information 502 are read out. The read-out of data from the second RAM 16 is controlled by the second memory controlling circuit 17. The storage location of high frequency data of the second encoding group MBb is detected from the decoding result of the first encoding group MBa by the variable-length-decoder 19, and the read-out address for the high frequency data is generated based on this detection result (the second memory controlling circuit 17). The second memory controlling circuit 17 reads the high frequency data of the second encoding group MBb from the second RAM 16 based on this read-out address.

The encoded data which are read out by the data retrieving processor 26 as described above are input to the decoding processor 27. The variable-length-decoder 19 successively decodes the prescribed number of coefficients of the encoding group from the start of the read-out encoding data. The dequantizing circuit 20 performs dequantization on the data decoded by the variable-length-decoder 19. Then, inverse DCT is performed by the inverse DCT circuit 21, and deblocking is performed by the deblocking circuit 22. The reproduced video signals are then output from the digital video signal output terminal 23.

As described above, one encoding group MB is assigned to one low frequency sync block SBL, and the portion of the encoded data of this encoding group from the beginning to the Lth bit is stored in the low frequency sync block SBL (in the above case, L=88). The portion of the encoded data at the (L+1) bit and beyond is stored in the high frequency sync blocks SBH accordingly. The location information (boundary information 502) indicating the storage location of the high frequency data is split and stored in two encoding groups which are the data packing unit. Therefore, during reproduction, the low frequency data of L bits stored in the low frequency sync block SBL are read out for each encoding group. Then, based on the location information about the high frequency data, the high frequency data are read out from the high frequency sync block SBH from the beginning. This makes it possible to arrange the encoded data of one encoding group MB which were divided and stored in three regions at the most (i.e., the assigned low frequency sync block, the high frequency sync block to be used when necessary and the adjacent low frequency sync block) in their original order, thereby reconstituting them.

As an example of the location information (boundary information 502) indicating the storage location for high frequency data, a read-out start address of the high frequency data are used. The read-out start address of the high frequency data can be readily obtained by memorizing the location of the end of the high frequency data decoded immediately therebefore. Furthermore, since the read-out start address of the high frequency data does not depend on the size of the control range over the code amount, the decoding processor for the encoded data which are controlled for the code amount over the wide range can be realized with simpler hardware.

Moreover, in a case where an error occurs in the encoded data during the reproduction, the range where the decoding becomes impossible is limited to within one encoding group MB for the low frequency data and to the interval up to the next boundary information 502 for the high frequency data. The ranges beyond these can be perfectly decoded.

In the present example, the boundary information 502 is generated for every two encoding groups MB and stored in the corresponding two low frequency sync blocks SBL. However, the generation of the boundary information 502 is not limited thereto, and the boundary information may be generated for every one encoding group MB or for every three encoding groups MB or more. When the boundary information 502 is generated for every encoding group MB and stored in each low frequency sync block SBL, it is not necessary to use the decoding result of other encoding group when generating the read-out address of the RAM during reproduction (i.e., the data packing unit is one encoding group), and the influence of the code error can be completely limited to one encoding group MB.

Moreover, when the unit of data packing is to be K number of encoding groups, the boundary information 502 is generated for every K number of encoding groups MB. The portions of the encoded data of the K number of encoding groups MB assigned to the corresponding K number of low frequency sync blocks SBL, each of which starts at the (L+1)th bit and goes beyond (high frequency data), are stored in the high frequency sync blocks SBH together. The information indicating their storage location (for example, a read-out start address for the K number of high frequency data) is evenly assigned to and stored in the K number of low frequency sync blocks SBL to which the K number of encoding groups are assigned. Alternatively, as in the above-described example, the 16 bits boundary information can be split into eight bits each and assigned to two of the K number of low frequency sync blocks. In that case, each of the (K−2) number of low frequency sync blocks SBL can have extra eight bits (one byte) of low frequency data. As described above, more encoded data can further be recorded by having a large value of K.

Generally, since the variable-length-decoding requires that the buffer read-out from the beginning of the encoding data, the code table reference and the detection of the starting location of the next encoding data be performed in one cycle, the high speed decoding is difficult. However, according to the present invention, as illustrated in the above-described example, by storing the information indicating the storage location of the high frequency data for every K number of low frequency sync blocks SBL, the variable-length-decoding can be performed in parallel for every K number of encoding groups. This makes it possible to perform decoding at high speed.

Moreover, in the present example, the number of the low frequency sync blocks SBL and the number of the high frequency sync blocks SBH, both of which are obtained by dividing the sync blocks, have the ratio of 1:2 (referred to as the division ratio). Therefore, there is a high probability that the high frequency data of the encoding group MB stored in the Xth low frequency sync block SBL are stored in the (2X−1)th and 2Xth high frequency sync blocks SBH. Therefore, as illustrated in FIG. 6, by alternately disposing the low frequency sync block 601 and the high frequency sync block 602 on the recording medium 13 with a ratio almost equal to the above-mentioned division ratio (1:2) in the order of storage of the variable-length-encoding data, the possibility of the encoded data (low frequency data and the high frequency data) in the same encoding group being recorded in proximity to each other on the recording medium 13 increases. As a result, even in the case where several sync blocks which are adjacent to one another on the recording medium 13 become incapable of being reproduced, the error extending over a wide range on the reproduced image can be prevented from occurring. Incidentally, since the boundary information 502 is split and stored in two successive low frequency sync blocks SBL, it is preferable to successively record at least 2n (n=1, 2, . . . ) number of low frequency sync blocks 601 on the recording medium 13.

EXAMPLE 2

Next, an image coding and recording/reproducing apparatus according to a second example of the present invention will be described. The fundamental structure of the image coding and recording/reproducing apparatus according to the second example is the same as that of the image coding and recording/reproducing apparatus 100 (FIG. 1) according to the first example. The image coding and recording/reproducing apparatus according to the second example differs from the image coding and recording/reproducing apparatus 100 in that the data storing processor and the data retrieving processor have different structures.

Figure 7A:
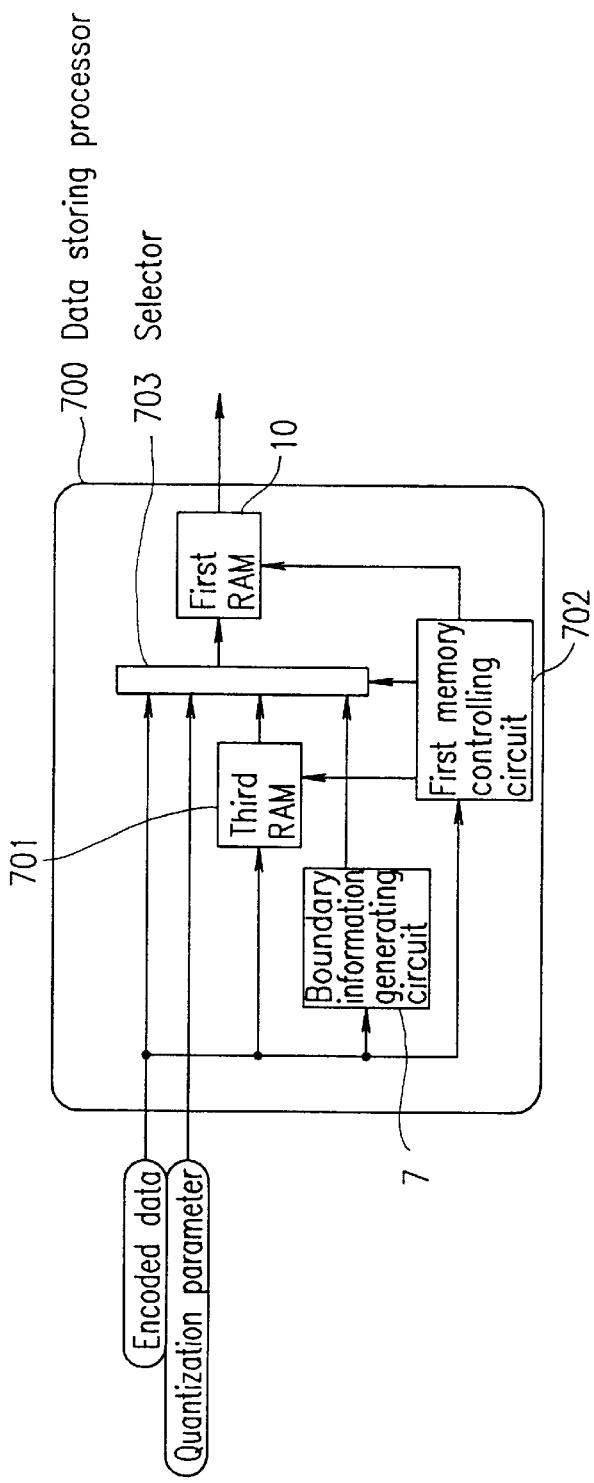
FIGS. 7A and 7B are block diagrams illustrating the structures of a data storing processor and data retrieving processor of an image coding and recording/reproducing apparatus according to a second example of the present invention.
Figure 7B:
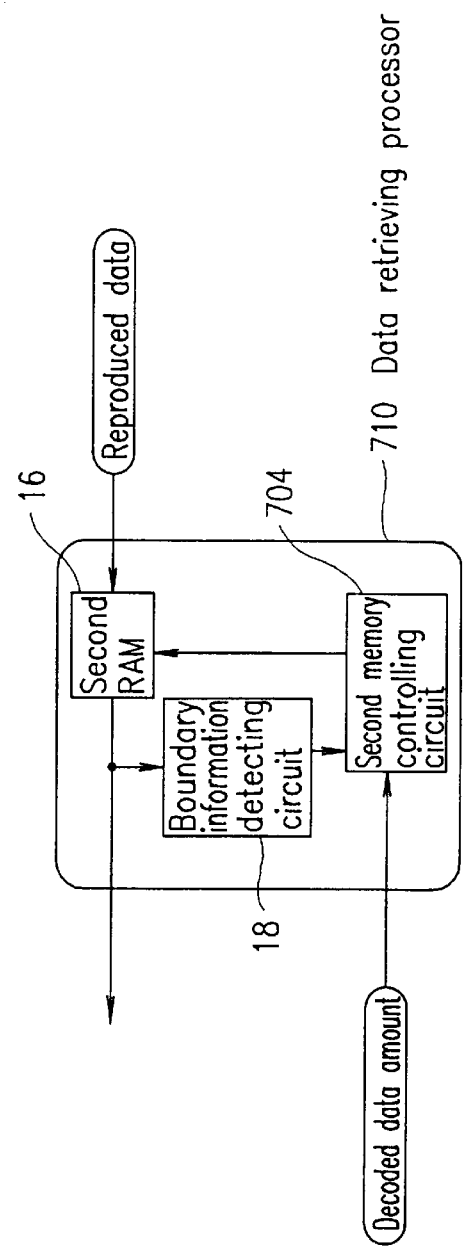

FIGS. 7A and 7B illustrate the structure of the data storing processor 700 and the structure of the data retrieving processor 710, respectively, of the image coding and recording/reproducing apparatus. Constituent elements which are the same as those in the image coding and recording/reproducing apparatus 100 illustrated in FIG. 1 are designated by the same reference numerals.

As illustrated in FIG. 7A, the data storing processor 700 includes a boundary information generating circuit 7, a first RAM 10, a third RAM 701, a first memory controlling circuit 702 and a selector 703. As illustrated in FIG. 7B, the data retrieving processor 710 includes a second RAM 16, a boundary information detecting circuit 18 and a second memory controlling circuit 704.

Also in the present example, one channel's worth of video data are stored in the 1080 sync blocks consisting of 360 low frequency sync blocks and 720 high frequency sync blocks as described in the first example. The data storage region of each sync block is 90 bytes. The boundary information indicating the storage location of the high frequency data in the high frequency sync block is split into eight bits each and assigned to two low frequency sync blocks.

As in the image coding and recording/reproducing apparatus 100, the variable-length-encoding data and the quantization parameter are input from the encoding processor to the data storing processor 700. The variable-length-encoded data are input to the selector 703, the third RAM 701, the boundary information generating circuit 7 and the first memory controlling circuit 702, and the quantization parameter is input to the selector 703.

The storage of the variable-length-encoded data in the sync blocks is performed by the data storing processor 700 as follows.

The boundary information generating circuit 7 generates the boundary information based on the input variable-length-encoded data and supplies it to the selector 703. The first memory controlling circuit 702 controls the write addresses of the third RAM 701, the selector 703 and the first RAM 10 based on the result of the variable-length-encoding of each encoding group. One channel write data (low frequency and high frequency sync blocks) to be recorded on the recording medium 13 are stored in the prescribed write addresses in the first RAM 10 by the first memory controlling circuit 702. The first RAM 10 has an address space which matches the size of the one channel's worth of sync blocks (recording sync blocks) on the recording medium 13. The first RAM 10 temporarily stores the one channel's worth of variable-length-encoded data 400, the quantization parameter 501 and the boundary information 502 (these 400, 501 and 502 are together referred to as one channel write data) as illustrated in FIGS. 5A and 5B. As to be described later, the high frequency data of the variable-length-encoded data are written in the third RAM 701 during data storage.

The storage of the variable-length-encoded data in the sync blocks is performed in units of two encoding groups. Hereinafter, the description will be given of the case where 360 encoding groups are included in one channel, and the encoded data in the (2X−1)th and 2Xth encoding groups (X≧2) are stored in the sync blocks.

Let MB(2X−1) and MB(2X) be the two encoding groups, whose code amounts (in bytes) are designated by SUM(2X−1) and SUM(2X), respectively, and whose corresponding low frequency sync blocks are designated by SBL(2X−1) and SBL(2X), respectively. The low frequency data storage region in each of the low frequency sync blocks SBL is 88 bytes in size as in the first example. There are four possible cases (A)–(D) as follows for the data packing by the data storing processor 700 depending on the code amount SUM of the encoding group MB:

(A) Both the code amounts SUM(2X−1) and SUM(2X) are larger than the low frequency data storage region (88 bytes).

(B) The code amount SUM(2X−1) is larger than the low frequency data storage region (88 bytes), and the code amount SUM(2X) is smaller than the low frequency data storage region (88 bytes).

(C) The code amount SUM(2X−1) is smaller than the low frequency data storage region (88 bytes), and the code amount SUM(2X) is larger than the low frequency data storage region (88 bytes).

(D) Both the code amounts SUM(2X−1) and SUM(2X) are smaller than the low frequency data storage region (88 bytes).

The cases (B) and (C) above are further classified into two cases with respect to the portion of the variable-length-encoded data overflowing the low frequency data storage region of one of the low frequency sync blocks: one (B1 and C1) where it still overflows the vacant region in other low frequency sync blocks; and the other (B2 and C2) where it is contained in the vacant region in another low frequency sync block.

FIGS. 8A–8D illustrate for each of the above-mentioned cases the variable-length-encoded data of the two encoding groups MB(2X−1) and MB(2X), the high frequency data stored in the high frequency sync blocks SBH and the read-out data during the reproduction. A portion of the variable-length-encoded data up to 88 bytes which can be stored in the data storage region of the low frequency sync blocks SBL is called the low frequency data, and a portion of the variable-length-encoded data more than 88 bytes is called the high frequency data.

In FIGS. 8A–8D, reference numeral 801 designates the variable-length-encoded data of the encoding group MB(2X−1), and the portion of the data 801 which is stored in the low frequency sync block SBL(2X−1) is designated as 801a. The portion of the variable-length-encoded data 801 which cannot be stored in the corresponding low frequency sync block SBL(2X−1) is designated as 801b. The portion of the variable-length-encoded data 801b which is stored in the high frequency sync block SBH is designated as 803, and the portion of the variable-length-encoded data 801b which is stored in the vacant region of the adjacent low frequency sync block SBL(2X) is designated as 804.

Similarly, reference numeral 802 designates the variable-length-encoded data of the encoding group MB(2X). The portion of the variable-length-encoded data 802 which is stored in the low frequency sync block SBL(2X) is designated as 802a, and the portion of the variable-length-encoded data 802 which cannot be stored in the corresponding low frequency sync block SBL(2X) is designated as 802b. The portion of the variable-length-encoded data 802b which is stored in the high frequency sync block SBH is designated as 805, and the portion of the variable-length-encoded data 802b which is stored in the vacant region of the adjacent low frequency sync block SBL(2X−1) is designated as 806.

Moreover, reference numerals 807 and 808 designate regions of the low frequency sync blocks SBL(2X−1) and SBL(2X), respectively, where the encoded data are not stored. Arbitrary data are recorded in the regions on the recording medium 13, which correspond to regions 807 and 808. Reference numeral 809 designates the start position of the high frequency data in the high frequency sync block SBH, and reference numerals 810, 811 and 812 designate the end position of the high frequency data. The order of arranging the variable-length-encoded data stored in each data storage region is indicated by an arrow.

Next, storage of the variable-length-encoded data will be described in detail in each of the above-mentioned cases (A)–(D).

(A) SUM(2X−1)≧88, SUM(2X)≧88:

As illustrated in FIG. 8A, when both code amounts SUM(2X−1) and SUM(2X) are greater than the low frequency data storage region (88 bytes), the portion of the variable-length-encoded data 801 of the encoding group MB(2X−1), which is from the start position (the first byte) to the 88th byte (low frequency data 801a), is stored in the corresponding low frequency sync block SBL(2X−1). The variable-length data 801b, which is the portion of variable-length-encoded data 801 at the 89th byte and beyond, is stored in the high frequency sync block SBH as the high frequency data 803 at the address indicated by 809 (beginning of high frequency data). The portion 801b follows the high frequency data of up to the previously stored encoding group MB(2X−2). The variable-length data 801b at the 89th byte and beyond are written in the third RAM 701 at the same time.

Next, the portion of the variable-length-encoded data 802 of the encoding group MB(2X), which is up to the 88th byte (low frequency data 802a), is stored in the corresponding low frequency sync block SBL(2X). The variable-length-encoded data 802b, which is the portion of the variable-length-encoded data 802 at the 89th byte and beyond, is stored in the high frequency sync block SBH as the high frequency data 805. The high frequency data 805 are successively stored at the beginning (at the 89th byte of the variable length encoded data 802), following the high frequency data 803. The high frequency data of the next encoding group MB(2X+1) is stored from the end position 810 of the high frequency data 805.

(B) SUM(2X−1) ≧88 and SUM(2X)<88:

FIG. 8B illustrates a case where the code amount SUM (2X−1) is equal to or greater than the low frequency data storage region (88 bytes), and the code amount SUM(2X) is smaller than the low frequency data storage region (88 bytes).

(B1) SUM(2X−1)+SUM(2X)−(88×2)≧0:

The portion of the variable-length-encoded data 801 of the encoding group MB(2X−1), which is from the beginning to the 88th byte (the low frequency data 801a), is stored in the corresponding low frequency sync block SBL(2X−1). The portion 801b of the variable-length-encoded data 801, which is at the 89th byte and beyond, is stored in the high frequency sync block SBH following the high frequency data up to the previously recorded encoding group MB(2X−2) and, simultaneously written in the third RAM 701.

Next, all the encoded data 802 of the encoding group MB(2X) are stored in the low frequency sync block SBL (2X) from the starting position. Then, the high frequency data 801b of the encoding group MB(2X−1), which have been written in the third RAM 701, are read out from the [SUM(2X−1)+SUM(2X)−88×2+1]th byte to the end and are successively stored in the opposite direction from the end of the low frequency sync block SBL(2X) (high frequency data S804). The high frequency data of the next encoding group MB(2X+1) are stored from the end position 811 of the data 803 in the high frequency sync block SBH.

(B2) SUM(2X−1)+SUM(2X)−(88×2)<0:

The data storage similar to that in (B1) is performed on the encoded data 801 of the encoding group MB(2X−1). That is, of the variable-length-encoded data 801, the low frequency data 801a are stored in the corresponding low frequency sync block SBL(2X−1), and the high frequency data 801b are stored in the high frequency sync block SBH, following the high frequency data of the previously processed encoding group and, at the same time, written in the third RAM 701. As to the encoding group MB(2X), all the encoded data 802 are stored in the low frequency sync block SBL(2X) from the start. And, the high frequency data 801b of the encoding group MB(2X−1), written in the third RAM

701, are read out from the first byte (i.e., the 89th byte of the variable-length-encoded data 801) to the end and are successively stored from the end of the low frequency sync block SBL(2X) in the opposite direction. The high frequency data of the next encoding group MB(2X+1) are stored from the position indicated by 809 in the high frequency sync block.

(C) SUM(2X−1)<88 and SUM(2X)≧88:

FIG. 8C illustrates a case where the code amount SUM(2X−1) is smaller than the low frequency data storage region (88 bytes), and the code amount SUM(2X) is equal to or greater than the low frequency data storage region (88 bytes).

(C1) SUM(2X−1)+SUM(2X)−(88×2)≧0:

All the variable-length-encoded data 801 of the encoding group MB(2X−1) are stored in the low frequency sync block SBL(2X−1). Next, the portion of the variable-length-encoded data 802 of the encoding group MB(2X), which is from the beginning to the 88th byte (low frequency data 802a), is stored in the corresponding low frequency sync block SBL(2X). The portion of the variable-length-encoded data 802, which is from the 89th byte to the [88−SUM(2X−1)]th byte, is stored in the vacant region of the low frequency sync block SBL(2X−1) (high frequency data 806). The remaining data 805 is stored in the high frequency sync block SBH starting at the position indicated by 809 following the high frequency data up to the encoding group MB(2X−2). The high frequency data of the next encoding group MB(2X+1) are written from the end 812 of the high frequency data 805.

(C2) SUM(2X−1)+SUM(2X)−(88×2)<0:

As to the variable-length-encoded data 801 of the encoding group MB(2X−1), the data storage processes similar to those in (C1) are performed. Next, the portion of the variable-length-encoded data 802 of the encoding group MB(2X), which is from the beginning to the 88th byte (the low frequency data 802a), is stored in the corresponding low frequency sync block SBL(2X). Then, the portion of the variable-length-encoded data 802, which is from the 89th byte to the end (the high frequency data 802b), is stored in the vacant region of the low frequency sync block SBL(2X−1), following the variable-length-encoded data 801 of the encoding group MB(2X−1). The high frequency data of the next encoding group MB(2X+1) are written from the position indicated by 809 in the high frequency sync block SBH.

(D) SUM(2X−1)<88 and SUM(2X)<88:

FIG. 8D illustrates a case where both the code amount SUM(2X−1) and the code amount SUM(2X) are smaller than the low frequency data storage region (88 bytes).

All the encoded data 801 and 802 of the encoding group MB(2X−1) and MB(2X), respectively, are stored in the corresponding low frequency sync blocks SBL(2X−1) and SBL(2X), respectively. The high frequency data of the next encoding group MB(2X+1) are written from the position indicated by 809 of the high frequency sync block SBH.

In each of the above-described cases (A)–(D), when there are high frequency data to be stored, the boundary information (not shown in the FIGS. 8A–8D) to be stored in each low frequency sync block SBL is at the address where the high frequency data of the variable-length-encoded data of the encoding group begins, i.e., the address indicated by 809 in FIGS. 8A–8D.

When X=1, the storage of the variable-length-encoded data 801 and 802 of the first and second encoding group MB(1) and MB(2), respectively, of each channel is performed like the above-described storage processes. The boundary information stored in the low frequency sync blocks SBL(1) and SBL(2) is at the end address of the high frequency data of all the encoding groups included in one channel.

The above-described data storage processes are successively performed on 360 encoding groups included in one channel. These data storage processes are performed by the first memory controlling circuit 702 controlling the third RAM 701, the address in the first RAM 10, and the selector 703.

Next, the reproduction of the variable-length-encoded data by the image coding and recording/reproducing apparatus of the present example will be described. As illustrated in FIG. 7B, during the data reproduction, the reproduced signals read from the recording medium 13 are processed in the reproduced signal processing circuit 15 (FIG. 1) and input to the data retrieving processor 710 as reproduced data. The input reproduced signals are written in the second RAM 16. The boundary information detecting circuit 18 detects addresses of the beginning and end of the high frequency data stored in the high frequency sync block SBH from the boundary information stored in the low frequency sync blocks SBL. Based on the detected boundary information, the second memory controlling circuit 704 generates the read-out addresses of the second RAM 16. Hereinafter, the data retrieval will be described in detail with reference to FIGS. 8A–8D.

When the variable-length-encoded data of the encoding group MB(2X−1) are decoded, the starting address (data boundary 809) of the high frequency data of the encoding groups MB(X−1) and MB(X) is detected from the boundary information stored in the low frequency sync blocks SBL(2X−1) and SBL(2X). Moreover, the end address of the high frequency data of the encoding groups MB(2X−1) and MB(2X) is detected from the boundary information stored in the low frequency sync blocks SBL(2X+1) and SBL(2X+2) to which the next two encoding groups are assigned (i.e., the starting address of the encoding groups MB(2X+1) and MB(2X)).

The variable-length-encoded data are read out from the second RAM 16 by the following rules. First, the variable-length-encoded data 801a stored in the low frequency sync block SBL(2X−1) are read out. Next, the variable-length-encoded data (high frequency data 803 and/or 805) stored between the starting address (data boundary 809) and the end address (data boundary 810, 811 or 812) of the high frequency sync block SBH are read out. Then, the variable-length-encoded data stored in the low frequency sync block SBL(2X) are read out in the opposite direction from the end.

By reading out the variable-length-encoded data from the second RAM 16 in accordance with the above-described rules, the retrieval of the variable-length-encoded data 801 from the encoding group MB(2X−1), which is the first encoding group of the two encoding groups serving as the data packing unit, can be performed in the original order in any situation. That is, as illustrated as the reproduced read-out data in FIGS. 8A–8D, the data can be retrieved such that 801a is first retrieved and 801b (803 and/or 804) is retrieved next.

On the other hand, as to the encoding group MB(2X), i.e., the second encoding group of the two encoding groups serving as the data packing unit, the reproduced data are read out as follows based on the code amount of the first encoding group MB(2X−1), i.e., the amount of the decoded data obtained as a result of the variable-length-decoding.

(1) SUM(2X−1)≧88 (aforementioned (A) and (B)):

As illustrated in FIGS. 8A and 8B, first, the variable-length-encoded data 802a of the low frequency sync block SBL(2X) are read out, and next the remaining high frequency data 805 (802b) are read out from the end address 820 of the encoded data 801 of the encoding group MB(2X−1). When the high frequency data 805 of the encoding group MB(2X) do not exist, the end address 820 of the encoded data 801 of the encoding group MB(2X−1) coincides with the end address of the high frequency data of the encoding groups MB(2X−1) and MB(2X). Therefore, the data are not read out any further.

(2) SUM<88 (aforementioned cases (C) and (D)):

As illustrated in FIG. 8C, first, the data 802a in the low frequency sync block SBL(2X) are read out. Next, the portion of the data (data 806) stored in the low frequency sync block SBL(2X−1), which is beyond the end address 821 of the variable-length-encoded data 801 of the encoding group MB(2X−1), and subsequently the high frequency data 805 stored in the high frequency sync block SBH are read out. When the high frequency data 805 of the encoding group MB(2X) do not exist, the starting address 809 of the high frequency data of the encoding groups MB(2X−1) and MB(2X) coincides with the end address of the high frequency data of the encoding groups MB(2X−1) and MB(2X). Therefore, the data are not read out any further.

Similarly, the reproduced data are read out from other encoding groups. However, for the first and second encoding groups MB(1) and MB(2) of each channel, since the starting point of the high frequency data is already determined, only the detection of the end address is performed. The end address of the high frequency data for the last two encoding groups MB(359) and MB(360) of each channel are read out from the boundary information stored in the first two low frequency sync blocks SBL(1) and SBL(2).

As described above, in the present example, data packing is performed in units of two successive encoding groups. In each data packing unit, the portion of each encoded data of the successive first and second encoding groups, which is from the beginning to the Lth bit at the most (L=8×88 in the above example), is stored in the corresponding first and second low frequency sync blocks, respectively, as the first data (low frequency data 801a and 802a). When the code amount of the second encoding group is less than L bits, the portion of the encoded data from the (L+1)th bit and beyond of the aforementioned first encoding group, which starts at its end and whose code amount is such that it can be stored in the vacant region of the aforementioned second low frequency sync block to which the aforementioned second encoding group is assigned, is stored in the vacant region of the second low frequency sync block as the second data (the high frequency data 804) in the opposite direction from its end. When the code amount of the first encoding group is less than L bits, the portion of the encoded data of the second encoding group beyond the (L+1)th bit is stored in the vacant region of the aforementioned first low frequency sync block to which the aforementioned first encoding group is assigned as the third data (the high frequency data 806). Furthermore, the portion of the encoded data of the aforementioned first and second encoding groups other than the aforementioned first, second and third data is stored in the high frequency sync block SBH as the fourth data (high frequency data 803 and/or 805). Then, the location information indicating the storage location in the aforementioned high frequency sync block of the aforementioned fourth data is stored as the boundary information for every data packing unit, i.e., in the aforementioned first and second low frequency sync blocks SBL to which the aforementioned first and second encoding groups are assigned.

During the reproduction, the data are decoded starting with the first encoding group for every data packing unit. When the encoded data of the first encoding group are decoded, the decoding is performed using the location information of the aforementioned fourth data stored in the aforementioned first and second low frequency sync blocks SBL in accordance with the prescribed rules. When the encoded data of the second encoding group are decoded, the data are read out in accordance with the prescribed rule using the location information of the aforementioned fourth data and the result of the decoding of the first encoding group. This makes it possible to read out in the original order the encoded data of each encoding group divided and stored in three regions at the most, thereby realizing a decoding processor with a simple structure.

Moreover, by storing the decoded data of the second encoding group in the vacant region of the first low frequency sync block from the (L+1)th bit (the high frequency data 806), even in a case where an error occurs in the boundary information indicating the storage location of the high frequency data stored in the high frequency sync block, the encoded data of the second encoding group stored in the first low frequency sync block can be decoded. Therefore, the range of propagation of the influence of the error in the boundary information can be reduced.

Moreover, the fourth data of each encoding group are successively stored in the prescribed high frequency sync block SBH from the starting point, and the storage location information of the high frequency data for the Pth (P=2, 3, . . . ) data packing unit is the starting address of the region of the high frequency sync block where data are not stored at the time of completing the encoded data storage of the (P−1)th data packing unit. Moreover, since the starting point of the high frequency data of the first data packing unit is fixed in each channel, the storage location information stored in the low frequency sync block of the first packing unit is the storage address of the end of the high frequency data when finishing the storage of the encoded data of all data packing units in that channel. That is, the end addresses of all the high frequency data of that channel are recorded in the low frequency sync blocks of the first packing unit. Because of this, for all packing units, the information indicating the storage location of the high frequency data is written in the corresponding low frequency sync blocks. Therefore, even in a case where the data stored in the low frequency sync block are erroneously reproduced for one data packing unit, the starting point of the high frequency data can be properly detected from the boundary information in the low frequency sync block in the next packing unit. Therefore, even in the data packing unit having an error, the data can be decoded at least up to the middle of the high frequency data.

As described above, according to the present example, an image coding and recording/reproducing apparatus resistant to errors can be realized with a comparatively simple decoding processor structure.

EXAMPLE 3

Next, an image coding and recording/reproducing apparatus according to a third example of the present invention will be described. The fundamental structure of the image coding and recording/reproducing apparatus according to the third example is the same as that of the image coding and recording/reproducing apparatus 100 (FIG. 1) according to the first example. The image coding and recording/reproducing apparatus according to the third example differs from the image coding and recording/reproducing apparatus 100 in that the data storing processor and the data retrieving processor have different structures.

FIGS. 9A and 9B illustrate the structure of the data storing processor 900 and the structure of the data retrieving processor 910, respectively, of the image coding and recording/reproducing apparatus according to the third example. Constituent elements which are the same as those in the image coding and recording/reproducing apparatus 100 illustrated in FIG. 1, those in the data storing processor 700 illustrated in FIG. 7A and those in the data retrieving processor 710 illustrated in FIG. 7B, are designated by the same reference numerals.

As illustrated in FIG. 9A, the data storing processor 900 includes a boundary information generating circuit 7, a first RAM 10, a third RAM 701, a first memory controlling circuit 901 and a selector 703. As illustrated in FIG. 9B, the data retrieving processor 910 includes a second RAM 16, a boundary information detecting circuit 18 and a second memory controlling circuit 902.

As in the image coding and recording/reproducing apparatus 100, the variable-length-encoding data and the quantization parameter are input from the encoding processor to the data storing processor 900. The variable-length-encoded data are input to the selector 703, the third RAM 701, the boundary information generating circuit 7 and the first memory controlling circuit 901. The quantization parameter is input to the selector 703.

The boundary information generating circuit 7 generates the boundary information based on the input variable-length-encoded data and supplies it to the selector 703. The first memory controlling circuit 901 controls the write addresses of the third RAM 701, the selector 703 and the first RAM 10 based on the result of the variable-length-encoding of each encoding group. One channel write data (low frequency and high frequency sync blocks) to be recorded on the recording medium 13 are stored in the prescribed write addresses in the first RAM 10 by the first memory controlling circuit 901. The first RAM 10 has an address space which matches the size of the one channel's worth of sync blocks (recording sync blocks) on the recording medium 13. As illustrated in FIGS. 5A and 5B, the first RAM 10 temporarily stores the one channel's worth of variable-length-encoded data 400, the quantization parameter 501 and the boundary information 502 (these 400, 501 and 502 are together referred to as one channel write data). As to be described later, the high frequency data of the variable-length-encoded data are written in the third RAM 701 during data storage.

Also in the third example, as described in the first and second examples, one channel's worth of video data are stored in 1080 sync blocks consisting of 360 low frequency sync blocks and 720 high frequency sync blocks, where the size of the data storage region of each sync block is 90 bytes. The quantization data 501 (FIGS. 5A and 5B) is stored in each sync blocks, and the boundary information 502 indicating the storage location of the high frequency data in the high frequency sync block is split in eight-bit each and stored in two low frequency sync blocks. Therefore, the recording region of the variable-length encoded data in each low frequency sync block is 88 bytes in size.

Also in the third example, as described in the second example, the variable-length encoded data are stored in the sync block in units of two encoding groups. Hereinafter, the description will be given of a case where one channel includes 360 encoding groups, and the encoded data of the (2X−1)th and 2Xth encoding groups (X≧2) are stored in the sync blocks.

Let MB(2X−1) and MB(2X) be the two encoding groups, whose code amounts (in bytes) are designated by SUM(2X−1) and SUM(2X), respectively, and whose corresponding low frequency sync blocks are designated by SBL(2X−1) and SBL(2X), respectively. There are four possible cases (A)–(D) as follows for the data packing by the data storing processor 900 depending on the code amount SUM of the encoding group MB:

(A) Both the code amounts SUM(2X−1) and SUM(2X) are larger than the low frequency data storage region (88 bytes).

(B) The code amount SUM(2X−1) is larger than the low frequency data storage region (88 bytes), and the code amount SUM(2X) is smaller than the low frequency data storage region (88 bytes).

(C) The code amount SUM(2X−1) is smaller than the low frequency data storage region (88 bytes), and the code amount SUM(2X) is larger than the low frequency data storage region (88 bytes).

(D) Both the code amounts SUM(2X−1) and SUM(2X) are smaller than the low frequency data storage region (88 bytes).

The cases (B) and (C) above are further classified into two cases with respect to the portion of the variable-length-encoded data overflowing the low frequency data storage region of one of the low frequency sync blocks: one (B1 and C1) where it still overflows the vacant region in other low frequency sync blocks; and the other (B2 and C2) where it is contained in the vacant region in other low frequency sync blocks.

FIGS. 10A–10D illustrate for each of the above-mentioned cases the variable-length-encoded data of the two encoding groups MB(2X−1) and MB(2X), the high frequency data stored in the high frequency sync blocks SBH, and the read-out data during the reproduction. A portion of the variable-length-encoded data up to 88 bytes which can be stored in the data storage region of the low frequency sync blocks SBL is called the low frequency data, and a portion of the variable-length-encoded data more than 88 bytes is called the high frequency data.

In FIGS. 10A–10D, reference numeral 101 designates the variable-length-encoded data of the encoding group MB(2X−1), and the portion of the data 101 which is stored in the low frequency sync block SBL(2X−1) is designated as 101a. The portion of the variable-length-encoded data 101 which cannot be stored in the corresponding low frequency sync block SBL(2X−1) is designated as 101b. The portion of the variable-length-encoded data 101b which is stored in the high frequency sync block SBH is designated as 103, and the portion of the variable-length-encoded data 101b which is stored in the vacant region of the adjacent low frequency sync block SBL(2X) is designated as 104.

Similarly, reference numeral 102 designates the variable-length-encoded data of the encoding group MB(2X). The portion of the variable-length-encoded data 102 which is stored in the low frequency sync block SBL(2X) is designated as 102a, and the portion of the variable-length-encoded data 102 which cannot be stored in the corresponding low frequency sync block SBL(2X) is designated as 102b. The portion of the variable-length-encoded data 102b which is stored in the high frequency sync block SBH is designated as 106, and the portion of the variable-length-encoded data 102b which is stored in the vacant region of the adjacent low frequency sync block SBL(2X−1) is designated as 105.

Moreover, reference numerals 107 and 108 designate regions of the low frequency sync blocks SBL(2X−1) and SBL(2X), respectively, where the encoded data are not stored. Arbitrary data are recorded in the regions on the recording medium 13, which correspond to regions 107 and 108. Reference numeral 109 designates the start position of the high frequency data in the high frequency sync block SBH, and reference numerals 110, 111 and 112 designate the end position of the high frequency data. The order of arranging the variable-length-encoded data stored in each data storage region is indicated by an arrow.

Next, storage of the variable-length-encoded data will be described in detail in each of the above-mentioned cases (A)–(D).

(A) $SUM(2X-1) \geqq 88$, $SUM(2X) \geqq 88$:

As illustrated in FIG. 10A, when both code amounts SUM(2X-1) and SUM(2X) are greater than the low frequency data storage region (88 bytes), the portion of the variable-length-encoded data 101 of the encoding group MB(2X-1), which is from the start position to the 88th byte (low frequency data 110a), is stored in the corresponding low frequency sync block SBL(2X-1). The variable-length data 101b, which is the portion of variable-length-encoded data 101 at the 89th byte and beyond, is stored in the high frequency sync block SBH as the high frequency data 103 at the address indicated by 109. The portion 101b follows the high frequency data of up to the previously stored encoding group MB(2X-2). The variable-length data 101b at the 89th byte and beyond are written in the third RAM 701 at the same time.

Next, the portion of the variable-length-encoded data 102 of the encoding group MB(2X), which is up to the 88th byte (low frequency data 102a), is stored in the corresponding low frequency sync block SBL(2X). The variable-length-encoded data 102b, which is the portion of the variable-length-encoded data 102 at the 89th byte and beyond, is stored in the high frequency sync block SBH as the high frequency data 106. The high frequency data 106 are stored from the end in the opposite direction, following the high frequency data 103 of the encoding group MB(2X-1). The high frequency data of the next encoding group MB(2X+1) are stored from the end position 110 of the high frequency data.

(B) $SUM(2X-1) \geqq 88$ and $SUM(2X) < 88$:

FIG. 10B illustrates a case where the code amount SUM(2X-1) is equal to or greater than the low frequency data storage region (88 bytes), and the code amount SUM(2X) is smaller than the low frequency data storage region (88 bytes). In this case, the data storage is similar to that in the example 2.

(C) $SUM(2X-1) < 88$ and $SUM(2X) \geqq 88$:

FIG. 10C illustrates a case where the code amount SUM(2X-1) is smaller than the low frequency data storage region (88 bytes), and the code amount SUM(2X) is equal to or greater than the low frequency data storage region (88 bytes).

(C1) $SUM(2X-1)+SUM(2X)-(88 \times 2) \geqq 0$:

All the variable-length-encoded data 101 of the encoding group MB(2X-1) are stored in the low frequency sync block SBL(2X-1). Next, the portion of the variable-length-encoded data 102 of the encoding group MB(2X), which is from the beginning to the 88th byte (low frequency data 102a), is stored in the corresponding low frequency sync block SBL(2X). The portion of the variable-length-encoded data 102, which is from the [SUM(2X-1)+SUM(2X)-(88×2)+1]th byte to the SUM(2X)th byte (high frequency data 105), is successively stored from the end of the low frequency sync block SBL(2X-1) in the opposite direction. The remaining data 106 is stored in the high frequency sync block SBH. The data 106 follows the high frequency data up to the encoding group MB(2X-2) and are stored from the end thereof in the opposite direction. The high frequency data of the next encoding group MB(2X+1) are written from the end 112 of the high frequency data 106.

(C2) $SUM(2X-1)+SUM(2X)-(88 \times 2) < 0$:

First, all the variable-length-encoded data 101 of the encoding group MB(2X-1) are stored in the low frequency sync block SBL(2X-1). Next, the portion of the variable-length-encoded data 102 of the encoding group MB(2X), which is from the beginning to the 88th byte (the low frequency data 102a), is stored in the corresponding low frequency sync block SBL(2X). Then, the portion of the variable-length-encoded data 102, which is at the 89th byte and beyond (the high frequency data 105), is successively stored from the end of the low frequency sync block SBL(2X-1) in the opposite direction. The high frequency data of the next encoding group MB(2X+1) are written from the position indicated by 109 in the high frequency sync block SBH.

(D) $SUM(2X-1) < 88$ and $SUM(2X) < 88$:

FIG. 10D illustrates a case where both the code amount SUM(2X-1) and the code amount SUM(2X) are smaller than the low frequency data storage region (88 bytes). In this case, the data storage is similar to that in the example 2.

In each of the above-described cases (A)–(D), when there are high frequency data to be stored, the boundary information (not shown in the FIGS. 8A–8D) to be stored in each low frequency sync block SBL is the address where the high frequency data of the variable-length-encoded data of the encoding group begins, i.e., the address indicated by 109 in FIGS. 10A–10D.

When X=1, the storage of the variable-length-encoded data 101 and 102 of the first and second encoding groups MB(1) and MB(2), respectively, of each channel is performed similarly as in the storage processes in example 2. The boundary information stored in the low frequency sync blocks SBL(1) and SBL(2) is the end address of all the high frequency data of one channel.

The above-described data storage processes are successively performed on 360 encoding groups included in one channel. These data storage processes are performed by the first memory controlling circuit 901, controlling the third RAM 701, the address in the first RAM 10 and the selector 703.

Next, the reproduction of the variable-length-encoded data by the image coding and recording/reproducing apparatus of the present example will be described. As illustrated in FIG. 9B, during the data reproduction, the reproduced signals read from the recording medium 13 are processed in the reproduced signal processing circuit 15 (FIG. 1) and input to the data retrieving processor 910 as reproduced data. The input reproduced signals are written in the second RAM 16. The boundary information detecting circuit 18 detects addresses of the beginning and end of the high frequency data, stored in the high frequency sync block SBH, from the boundary information stored in the low frequency sync blocks SBL. Based on the detected boundary information, the second memory controlling circuit 902 generates the read-out addresses of the second RAM 16. Hereinafter, the data retrieval will be described in detail with reference to FIGS. 10A–10D.

When the variable-length-encoded data of the encoding group MB(2X-1) are decoded, the starting address (data boundary 109) of the high frequency data of the encoding groups MB(X-1) and MB(X) is detected from the boundary information stored in the low frequency sync blocks SBL (2X-1) and SBL(2X), as described in example 2. Moreover, the end address of the high frequency data of the encoding groups MB(2X−1) and MB(2X) is detected from the boundary information stored in the low frequency sync blocks SBL(2X+1) and SBL(2X+2) to which the next two encoding groups are assigned (i.e., the starting address of the high frequency data of the encoding groups MB(2X+1) and MB(2X+2)).

The variable-length-encoded data are read out from the second RAM 16 by the following rules. First, the variable-length-encoded data 110a stored in the low frequency sync block SBL(2X−1) are read out. Next, the variable-length-encoded data (high frequency data 103 and/or 106) stored between the starting address (data boundary 109) and the end address (data boundary 110, 111 or 112) of the high frequency sync block SBH are read out. Then, the variable-length-encoded data stored in the low frequency sync block SBL(2X) are read out in the opposite direction from the end. As a result, the variable-length encoded data arranged in the low frequency sync block SBL(2X) in the opposite direction from the end (if any) are read out from the data end in the opposite direction.

As described above, by reading out the variable-length-encoded data from the second RAM 16 in accordance with the above-described rules, the retrieval of the variable-length-encoded data 101 from the encoding group MB(2X−1), which is the first encoding group of the two encoding groups serving as the data packing unit, can be performed in the original order in any situation. That is, as illustrated as the reproduced read-out data in FIGS. 10A–10D, the data can be retrieved such that 101a is first retrieved and 101b (103 and/or 104) is retrieved next.

The variable-length encoded data of the encoding group MB(2X) are read out as in example 2. However, the high frequency data 106 stored in the high frequency sync block SBH are read out from the end address (110 in FIG. 10A or 112 in FIG. 10C) of the high frequency data in the opposite direction. Therefore, the present example differs from example 2 in that it is not necessary to obtain the address at the boundary between the high frequency data 103 of the encoding group MB(2X−1) and the high frequency data 106 of the encoding group MB(2X), especially in the case (A) illustrated in FIG. 10A. As a result, it is not necessary to detect the storage location of the high frequency data 106 of the encoding group MB(2X) from the decoding result of the encoding group MB(2X−1) (the end address of the high frequency data 103 is not required). Accordingly, it is possible to perform decoding for every encoding group.

Similarly, the reproduced data are read out from other encoding groups. However, for the first and second encoding groups MB(1) and MB(2) of each channel, since the starting point of the high frequency data is already determined, only the detection of the end address is performed. The end address of the high frequency data for the last two encoding groups MB(359) and MB(360) of each channel are read out from the boundary information stored in the first two low frequency sync blocks SBL(1) and SBL(2).

As described above, in the present example, data packing is performed in units of two successive encoding groups. In each data packing unit, the portion of each encoded data of the successive first and second encoding groups, which is from the beginning to the Lth bit at the most (L=8×88 in the above example), is stored in the corresponding first and second low frequency sync blocks, respectively, as the first data (low frequency data 101a and 102a).

When the code amount of the second encoding group is less than L bits, the portion of the encoded data from the (L+1)th bit and beyond of the first encoding group, which starts at its end and whose code amount is such that it can be stored in the vacant region of the second low frequency sync block to which the second encoding group is assigned, is stored in the vacant region of the second low frequency sync block as the second data (the high frequency data 104) in the opposite direction from its end.

When the code amount of the first encoding group is less than L bits, the portion of the encoded data from the (L+1)th bit and beyond of the second encoding group, which starts at its end and whose code amount is such that it can be stored in the vacant region of the first low frequency sync block to which the first encoding group is assigned, is stored in the vacant region of the first low frequency sync block as the third data (the high frequency data 105) in the opposite direction from its end.

Furthermore, the portion of the encoded data of the first and second encoding groups other than the aforementioned first, second and third data is stored in the high frequency sync block SBH as the fourth data (high frequency data 103 and/or 106). When this is being done, the encoded data 103 of the first encoding group are successively arranged from the beginning and stored, and the encoded data 106 of the second encoding group are arranged from the end in the opposite direction and stored. Then, the location information indicating the storage location of the fourth data in the high frequency sync block is stored as the boundary information for every data packing unit, i.e., in the aforementioned first and second low frequency sync blocks SBL to which the aforementioned first and second encoding groups are assigned.

During the reproduction, the data are decoded starting with the first encoding group for each data packing unit. When the encoded data of the first encoding group are decoded, the decoding is performed using the location information of the fourth data stored in the first and second low frequency sync blocks SBL in accordance with the prescribed rules. When the encoded data of the second encoding group are decoded, the data are read out in accordance with the prescribed rule using the location information of the fourth data and the result of decoding of the first encoding group. This makes it possible to read out in the original order the encoded data of each encoding group divided and stored in three regions at the most, thereby realizing a decoding processor with a simpler structure.

Furthermore, according to the present example, the variable-length encoded data (low frequency data and high frequency data) can be decoded and arranged for every encoding group, using the storage location information of the high frequency data. Therefore, although the storage location information of the high frequency data is stored in every two encoding groups, error propagation of the encoded data can perfectly be contained in a single encoding group.

Although the variable-length encoded data are stored in units of bytes in the first, second and third examples, it is also possible to perform the data storage in units of bits. In this case, the dummy data which are required for making the code amount of one encoding group to be the integral multiple of one byte is not necessary. However, three extra bits become necessary for the boundary information.

Although one field of video signals is divided into two channels and recorded in the above examples, the present invention can be used in a case where the field is not divided or is divided into three channels or more with the similar effect.

Although the encoding group in the above examples consists of eight DCT blocks of eight lines×eight pixels, the orthogonal transform is not limited to the DCT of eight lines×eight pixels. Furthermore, the encoding group does not have to be configured in units of transformation blocks. It is possible to configure the encoding block with transform coefficients from a plurality of transformation blocks.

Although video signals are encoded in the order of input and stored in the above-examples, the video signals can be shuffled in units of encoding groups and stored.

Although the data storage is performed on the data obtained by successively picking up one code at a time from low frequency side and by rearranging the codes in accordance with the results of the variable-length encoding of the DCT blocks in the encoding group, the order of rearranging the variable-length codes in the encoding group is not limited thereto. The data can be arranged according to other rules.

As described above, according to the present invention, the portion of the encoded data, which is from the beginning to the Lth bit, is stored in the respective low frequency sync blocks. The portion of the encoded data, which is at the (L+1)th bit and beyond, is successively stored and recorded in the high frequency sync blocks.

During reproduction, the encoded data are decoded in units of encoding groups in the order of storage. The encoded data are successively arranged in the original order and decoded by reading out the low frequency data of L bits stored in the low frequency sync blocks and then by successively reading out the high frequency data from the beginning, the high frequency data being in the high frequency sync blocks and not decoded yet. Therefore, the preprocessing for the decoding becomes simple, and an image coding and recording/reproducing apparatus which can also decode the encoded data whose code amount is controlled over a wide range with simple hardware can be realized.

As described above, according to an image coding and recording/reproducing apparatus of the present invention, since it is not necessary to perform a partial decoding for detecting the data storage location as a preprocessing for the decoding, the preprocessing for the decoding becomes simpler regardless of the size of the code amount control range. Therefore, an image coding and recording/reproducing apparatus which can also decode the encoded data whose code amount is controlled over a wide range with simple hardware.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image coding and recording/reproducing apparatus for encoding video signals using variable-length coding and for recording the video signals in units of fixed-length sync blocks, the apparatus comprising:

an orthogonal transform unit for performing an orthogonal transform on each transformation block including a plurality of pixels and for obtaining orthogonal transform coefficients for each transformation block;

a coding processor for generating encoded data for a plurality of encoding groups so that a total amount of the encoded data for the plurality of encoding groups is equal to or less than a predetermined amount, each of the plurality of encoding groups including a plurality of the transformation blocks, the encoded data being obtained by variable-length encoding the orthogonal transform coefficients of each transformation block and by arranging the resultant encoded transform coefficients in the order of increasing component frequency starting with a low frequency component, a respective amount of the encoded data for each encoding group being dependent upon the encoding group;

a storing processor for dividing a plurality of the sync blocks into low frequency sync blocks and high frequency sync blocks, each of the low frequency sync blocks being assigned to one of the encoding groups, a first portion, which is from a beginning up to an Lth bit, of the encoded data of the encoding group being stored in the corresponding low frequency sync block from a beginning thereof, a second portion, which is at an (L+1)th bit and beyond, if any, of the encoded data of the encoding group being stored in the high frequency sync blocks in a prescribed order, the number of the high frequency sync blocks for each encoding group being dependent upon the respective amount of the encoded data for each encoding group; and a recording unit for recording the low frequency sync blocks and the high frequency sync blocks which store the encoded data therein on a recording medium.

2. An image coding and recording/reproducing apparatus according to claim 1, wherein the storing processor includes means for storing location information for the encoded data of the encoding group in a predetermined region in the low frequency sync block to which the encoding group is assigned, the location information indicating a location in the high frequency sync block at which the second portion of the encoded data of the encoding group is stored.

3. An image coding and recording/reproducing apparatus according to claim 1, wherein the storing processor includes:

means for holding the respective second portions of the encoded data of K number of encoding groups to be stored together in the high frequency sync blocks, K number of low frequency sync blocks being assigned to the K number of encoding groups, respectively; and means for placing location information indicating a location of the second portions in the K number of low frequency sync blocks, by equally dividing the location information into K, and assigning the K-divided location information among the K number of low frequency sync blocks, the location information indicating the location in which the second portions of the K number of encoding groups are stored together in the high frequency sync blocks.

4. An image coding and recording/reproducing apparatus according to claim 1, wherein a data packing is performed in units of two successive encoding groups, wherein:

respective first portions of encoded data of a first and second encoding groups, which are from a beginning to an Lth bit at the most, respectively, are stored as first data in first and second low frequency sync blocks, respectively, the first and second low frequency sync blocks being assigned to the first and second encoding groups, respectively;

in a case where a code amount of the second encoding group is less than L bits, thereby there being a vacant region in the second low frequency sync block including an end of the second low frequency sync block, a first part of the second portion of the encoded data of the first encoding group is stored as second data in the vacant region of the second low frequency sync block in an opposite direction from the end of the second low frequency sync block, a code amount of the first part the second portion being within that of the vacant region;

in a case where a code amount of the first encoding group is less than L bits, thereby there being a vacant region in the first low frequency sync block including an end of the first low frequency sync block, a second part of the second portion of the encoded data of the second encoding group is stored as third data in the vacant region of the first low frequency sync block, the storing unit further comprising:

a first storing means for storing portions of the encoded data of the first and second encoding groups other than the first, second and third data in the high frequency sync blocks as fourth data; and a second storing means for storing location information in the first and second low frequency sync blocks, the location information indicating a location at which the fourth data is stored in the high frequency sync blocks.

5. An image coding and recording/reproducing apparatus according to claim 4, wherein the encoded data are decoded starting with the first encoding group in units of the data packing units.

6. An image coding and recording/reproducing apparatus according to claim 4, wherein the third data are stored in the vacant region of the first low frequency sync block from the (L+1)th bit of the encoded data of the second encoding group.

7. An image coding and recording/reproducing apparatus according to claim 4, wherein:

the first storing means successively and continuously stores the fourth data of a predetermined number of the data packing unit from a beginning of the high frequency sync blocks corresponding to the predetermined number of the packing unit;

the location information of the fourth data in the Pth data packing unit (P is an integer equal to or greater than 2) indicates a start address of an available region of the high frequency sync blocks, where no data have been stored in the available region yet, when a storage of encoded data of a (P−1)th data packing unit is completed; and the location information of the fourth data of the first data packing unit indicates an address at which the end of the fourth data is stored when a storage of the encoded data of the predetermined number of the data packing units is completed.

8. An image coding and recording/reproducing apparatus according to claim 4, wherein the third data are stored in the vacant region of the first low frequency sync bock in an opposite direction from the end of the second portion of the second encoding group at the (L+1)th bit and beyond, and wherein the first storing means successively arranges the data of the first encoding group included in the fourth data from the beginning thereof, and the data of the second encoding group included in the fourth data in an opposite direction from an end thereof, when the fourth data are stored in the high frequency sync blocks.

9. An image coding and recording/reproducing apparatus according to claim 1, wherein the recording unit records data so that the low frequency sync blocks and the high frequency sync blocks are alternately disposed in the order of data storage with an approximate ratio of numbers of the low frequency sync blocks and the high frequency sync blocks, the numbers being determined by the storing processor.

10. An image coding and recording/reproducing apparatus according to claim 4, wherein the recording unit records data so that the low frequency sync blocks and the high frequency sync blocks are alternately disposed in the order of data storage with an approximate ratio of numbers of the low frequency sync blocks and the high frequency sync blocks, the numbers being determined by the storing processor.

11. An image coding and recording/reproducing method for encoding video signals using variable-length coding and for recording the video signals in units of fixed-length sync blocks, the method comprising the steps of:

performing an orthogonal transform on each transformation block including a plurality of pixels and obtaining orthogonal transform coefficients for each transformation block;

generating encoded data for a plurality of encoding groups so that a total amount of the encoded data for the plurality of encoding groups is equal to or less than a predetermined amount, each of the plurality of encoding groups including a plurality of the transformation blocks, the encoded data being obtained by variable-length encoding the orthogonal transform coefficients of each transformation block and by arranging the resultant encoded transform coefficients in the order of increasing component frequency starting with a low frequency component, a respective amount of the encoded data for each encoding group being dependent upon the encoding group;

storing data by dividing a plurality of the sync blocks into low frequency sync blocks and high frequency sync blocks, assigning each of the low frequency sync blocks to a respective one of the encoding groups, storing a first portion, which is from a beginning to an Lth bit, of the encoded data of the encoding group in the corresponding low frequency sync block, and storing a second portion, which is at an (L+1)th bit and beyond, if any, of the encoded data of the encoding group in the high frequency sync blocks in a prescribed order, the number of the high frequency sync blocks for each encoding group being dependent upon the respective amount of the encoded data for each encoding group; and recording the low frequency sync blocks and the high frequency sync blocks storing the encoded data therein on a recording medium.

12. An image coding and recording/reproducing method according to claim 11, wherein the step of storing data includes the step of storing location information for the data of the encoding group in a predetermined region in the low frequency sync block to which the encoding group is assigned, the location information indicating a location in the high frequency sync block at which the second portion of the encoded data of the encoding group is stored.

13. An image coding and recording/reproducing method according to claim 11, wherein the step of storing data includes the steps of:

holding the respective second portions of the encoded data of K number of encoding groups to be stored together in the high frequency sync blocks, K number of low frequency sync blocks being assigned to the K number of encoding groups, respectively; and placing location information indicating a location of the second portions in the K number of low frequency sync blocks, by equally dividing the location information into K and assigning the K-divided location information among the K number of low frequency sync blocks, the location information indicating the location in which the second portions of the K number of encoding groups are stored together in the high frequency sync blocks.

14. An image coding and recording/reproducing method according to claim 11, wherein a data packing is performed in units of two successive encoding groups in the step of storing data, the step of storing data comprising the steps of:

(a) storing respective first portions of encoded data of a first and second encoding groups as first data in first and second low frequency sync blocks, respectively, each first portion being from a beginning to an Lth bit at the most, the first and second low frequency sync block being assigned to the first and second encoding groups, respectively;

(b) in a case where a code amount of the second encoding group is less than L bits, thereby there being a vacant region in the second low frequency sync block including an end of the second low frequency sync block, storing a first part of the second portion of the encoded data of the first encoding group as second data in the vacant region of the second low frequency sync block in an opposite direction from the end of the second low frequency sync block, a code amount of the first part of the second portion being within that of the vacant region;

(c) in a case where a code amount of the first encoding group is less than L bits, thereby there being a vacant region in the first low frequency sync block including an end of the first low frequency sync block, storing a second part of the second portion of the encoded data of the second encoding group as third data in the vacant region of the first low frequency sync block;

(d) storing portions of the encoded data of the first and second encoding groups other than the first, second and third data in the high frequency sync blocks as fourth data; and (e) storing location information in the first and second low frequency sync blocks, the location information indicating a location at which the fourth data is stored in the high frequency sync blocks.

15. An image coding and recording/reproducing method according to claim 14, comprising the step of decoding the encoded data starting with the first encoding group in units of the data packing during reproduction.

16. An image coding and recording/reproducing method according to claim 14, wherein the third data are stored in the vacant region of the first low frequency sync block from the (L+1)th bit of the encoded data of the second encoding group in the step (c).

17. An image coding and recording/reproducing method according to claim 14, wherein in the step of storing data:

the fourth data of each encoding group in a predetermined number of the data packing unit are successively and continuously stored from the beginning of the high frequency sync blocks corresponding to the predetermined numbers of the data packing unit;

the location information of the fourth data in the Pth data packing unit (P is an integer equal to or greater than 2) indicates a start address of an available region of the high frequency sync blocks, where no data have been stored in the available region yet, when a storage of encoded data of a (P−1)th data packing unit is completed; and the location information of the fourth data of the first data packing unit indicates an address at which the end of the fourth data is stored when a storage of the encoded data of the predetermined number of the data packing units is completed.

18. An image coding and recording/reproducing method according to claim 14, wherein in the step (c), the third data are stored in the vacant region of the first low frequency sync bock in an opposite direction from the end of the second portion of the second encoding group at the (L+1)th bit and beyond, and wherein in the step (d), the data of the first encoding group included in the fourth data are successively arranged from the beginning thereof, and the data of the second encoding group included in the fourth data are successively arranged in an opposite direction from an end thereof, when the fourth data are stored in the high frequency sync blocks.

19. An image coding and recording/reproducing method according to claim 11, wherein in the step of recording data, the recording is performed so that the low frequency sync blocks and the high frequency sync blocks are alternately disposed in the order of data storage with an approximate ratio of numbers of the low frequency sync blocks and the high frequency sync blocks, the numbers being determined in the step of storing processor.

20. An image coding and recording/reproducing method according to claim 14, wherein in the step of recording data, the recording is performed so that the low frequency sync blocks and the high frequency sync blocks are alternately disposed in the order of data storage with an approximate ratio of numbers of the low frequency sync blocks and the high frequency sync blocks, the numbers being determined in the step of storing processor.

* * * * *